(12) United States Patent
Swilling et al.

(10) Patent No.: US 10,144,465 B1
(45) Date of Patent: *Dec. 4, 2018

(54) ACHIEVING A TARGET GAIT BEHAVIOR IN A LEGGED ROBOT

(71) Applicant: Boston Dynamics, Inc., Waltham, MA (US)

(72) Inventors: Benjamin Swilling, Waltham, MA (US); Eric Whitman, Waltham, MA (US); Stephen Berard, Waltham, MA (US); Alfred Anthony Rizzi, Waltham, MA (US); Alex Yu Khripin, Waltham, MA (US); Gina Christine Fay, Waltham, MA (US)

(73) Assignee: Boston Dynamics, Inc., Waltham, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/006,943

(22) Filed: Jun. 13, 2018

Related U.S. Application Data

(63) Continuation of application No. 15/194,493, filed on Jun. 27, 2016, now Pat. No. 10,017,218.

(Continued)

(51) Int. Cl.
*G06F 19/00* (2018.01)
*B62D 57/032* (2006.01)
(Continued)

(52) U.S. Cl.
CPC .......... *B62D 57/032* (2013.01); *B25J 9/0006* (2013.01); *B25J 9/162* (2013.01); *B25J 9/1664* (2013.01); *Y10S 901/01* (2013.01)

(58) Field of Classification Search
CPC .... B62D 57/032; B62D 57/02; B25J 19/0091; B25J 9/1633; B25J 9/1664; B25J 9/1628;
(Continued)

(56) References Cited

U.S. PATENT DOCUMENTS 7,496,428 B2   2/2009  Takenaka et al.
8,457,830 B2   6/2013  Goulding
(Continued)

OTHER PUBLICATIONS

Burridge et al., "Sequential Composition of Dynamiclaly Dexterous Robot Behaviours," The International Journal of Robotics Research 1999, pp. 534-555, vol. 18, No. 6.
(Continued)

*Primary Examiner* — Rachid Bendidi
(74) *Attorney, Agent, or Firm* — Honigman Miller Schwartz and Cohn LLP

(57) ABSTRACT

A legged robot may seek to operate according to a target gait. The legged robot may include leg members and leg joints. Possibly based on the target gait and state of the legged robot, an ordered list of gait controllers may be obtained. The gait controllers in the ordered list may define respective gaits of the legged robot, and may include respective validity checks and output parameters for the respective gaits. The ordered list may begin with a target gait controller that defines the target gait. The ordered list may be traversed in order from the target gait controller until a validity check associated with a particular gait controller passes. The legged robot may be instructed to actuate the leg members and/or leg joints according to output parameters of the particular gait controller.

14 Claims, 13 Drawing Sheets

Related U.S. Application Data

(60) Provisional application No. 62/253,807, filed on Nov. 11, 2015.

(51) Int. Cl.
    *B25J 9/16* (2006.01)
    *B25J 9/00* (2006.01)

(58) Field of Classification Search
    CPC .......... B25J 9/1666; B25J 13/006; B25J 5/00; G06N 3/008; Y10S 901/01
    See application file for complete search history.

(56) References Cited

U.S. PATENT DOCUMENTS

| | | | |
|---|---|---|---|
| 8,974,543 B2 | 3/2015 | Balboni et al. | |
| 9,044,859 B2* | 6/2015 | Cory | B62D 57/032 |
| 9,586,316 B1 | 3/2017 | Swilling | |
| 9,789,607 B1 | 10/2017 | Whitman | |
| 2011/0231050 A1* | 9/2011 | Goulding | B62D 57/024 |
| | | | 701/26 |
| 2011/0264264 A1* | 10/2011 | Shirokura | B62D 57/032 |
| | | | 700/245 |
| 2012/0245734 A1* | 9/2012 | Yun | B62D 57/032 |
| | | | 700/253 |
| 2012/0310412 A1* | 12/2012 | Seo | B25J 9/0006 |
| | | | 700/254 |
| 2013/0310979 A1* | 11/2013 | Herr | B62D 57/032 |
| | | | 700/258 |
| 2014/0261887 A1* | 9/2014 | Groot | G01S 7/415 |
| | | | 141/383 |
| 2015/0202768 A1* | 7/2015 | Moridaira | B62D 57/032 |
| | | | 700/258 |

OTHER PUBLICATIONS

Haynes et al., "Gaits and Gait Transitions for Legged Robots," Proceedings of the 2006 IEEE International Conference on Robotics and Automation, May 2006, pp. 1117-1122.

Johnson et al., "Disturbance Detection, Identification, and Recovery by Gait Transition in Legged Robots," RSJ International Conference on Intelligent Robots and Systems, IEEE, Oct. 18-22, 2010, Taipei, Taiwan, pp. 5347-5353.

Kantor et al., "Sequential composition for control of underactuated systems," Robotics Institute, School of Computer Science, Nov. 2003, 19 pages.

\* cited by examiner

ACHIEVING A TARGET GAIT BEHAVIOR IN A LEGGED ROBOT

CROSS-REFERENCE TO RELATED APPLICATION

This U.S. patent application is a continuation of, and claims priority under 35 U.S.C. § 120 from, U.S. patent application Ser. No. 15/194,493, filed on Jun. 27, 2016, which claims priority under 35 U.S.C. § 119(e) to U.S. Provisional Application 62/253,807, filed Nov. 11, 2015, which is hereby incorporated by reference in its entirety.

BACKGROUND

A gait of a legged robot is typically viewed as a cyclic pattern of leg movements that produces locomotion through a sequence of foot contacts with a surface. The legs provide support for the body of the legged robot while the forces resulting from surface contact propel the legged robot. Gaits can differ in a variety of ways, and different gaits produce different styles of locomotion. Selection of an appropriate gait when the legged robot is in a particular state can be challenging, as some gaits might result in the robot becoming unstable or exhibiting undesirable movement.

SUMMARY

The implementations herein involve selection of a gait for a legged robot. In some cases, the gait may be selected based on a state of the legged robot and/or one or more input commands obtained by the legged robot. Each gait may be represented as a gait controller that includes a mapping from the state of the legged robot and/or the input command(s) to output parameters that achieve the gait. Each gait controller may include a validity check that tests whether the instantaneous state of the legged robot allows the associated gait to be achieved.

In particular, the gait controllers may be arranged in an ordered list such that a target gait controller for a target gait is at the beginning of the ordered list, and other gait controllers are placed in the ordered list based on how the legged robot can transition from their respective gaits to the target gait. In some implementations, gait controllers representing gaits that are more similar to the target gait are placed closer to the beginning of the ordered list than those representing gaits that are less similar to the target gait.

The ordered list may be traversed in order from its beginning, and the gait controllers therein may be examined. For each gait controller examined, the associated validity check may be tested. A validity check associated with a particular gait controller may determine whether the gait controller is permitted to operate based on the state of the robot and/or a sensed environment of the robot. When a validity check of a particular gait controller passes, the legged robot may be operated for a period of time according to the associated gait. The ordered list may be traversed again from the beginning, resulting in the selection of the same or a different gait controller. The process may repeat several dozen or hundred times per second to provide fine-grained control over the legged robot's locomotion.

Accordingly, a first example implementation may involve determining that a legged robot is to operate according to a target gait. The legged robot may include leg members and leg joints. Possibly based on the target gait and state of the legged robot, an ordered list of gait controllers may be obtained. The gait controllers in the ordered list may define respective gaits of the legged robot, and may include respective validity checks and output parameters for the respective gaits. The ordered list may begin with a target gait controller that defines the target gait. The ordered list may be traversed in order from the target gait controller until a validity check associated with a particular gait controller passes. The legged robot may be instructed to actuate the leg members and/or leg joints according to output parameters of the particular gait controller.

In a second example implementation, an article of manufacture may include a non-transitory computer-readable medium, having stored thereon program instructions that, upon execution by a computing device, cause the computing device to perform operations in accordance with the first example implementation.

In a third example implementation, a legged robot may include leg members, leg joints, at least one processor, and data storage. Program instructions may be stored in the data storage, and upon execution by the at least one processor, the program instructions may cause the legged robot to perform operations in accordance with the first example implementation.

In a fourth example implementation, a system may include various means for carrying out each of the operations of the first example implementation.

These as well as other implementations, aspects, features, advantages, and alternatives will become apparent to those of ordinary skill in the art by reading the following detailed description, with reference where appropriate to the accompanying drawings. Further, it should be understood that this summary and other descriptions and figures provided herein are intended to illustrate implementations by way of example only and, as such, that numerous variations are possible. For instance, structural elements and process steps can be rearranged, combined, distributed, eliminated, or otherwise changed, while remaining within the scope of the implementations as claimed.

DETAILED DESCRIPTION

Example methods, devices, and systems are described herein. It should be understood that the words "example" and "exemplary" are used herein to mean "serving as an example, instance, or illustration." Any implementation, aspect, or feature described herein as being an "example" or "exemplary" is not necessarily to be construed as preferred or advantageous over other implementations, aspects, or features. Alternative implementations, aspects, or features can be utilized, and other changes can be made, without departing from the scope of the subject matter presented herein.

Thus, the example implementations described herein are not meant to be limiting. Aspects of the present disclosure, as generally described herein, and illustrated in the figures, can be arranged, substituted, combined, separated, and designed in a wide variety of different configurations, all of which are contemplated herein.

Further, unless context suggests otherwise, the features illustrated in each of the figures may be used in combination with one another. Thus, the figures should be generally viewed as component aspects of one or more overall implementations, with the understanding that not all illustrated features are necessary for each implementation.

1. EXAMPLE ROBOTIC DEVICES

Figure 1:
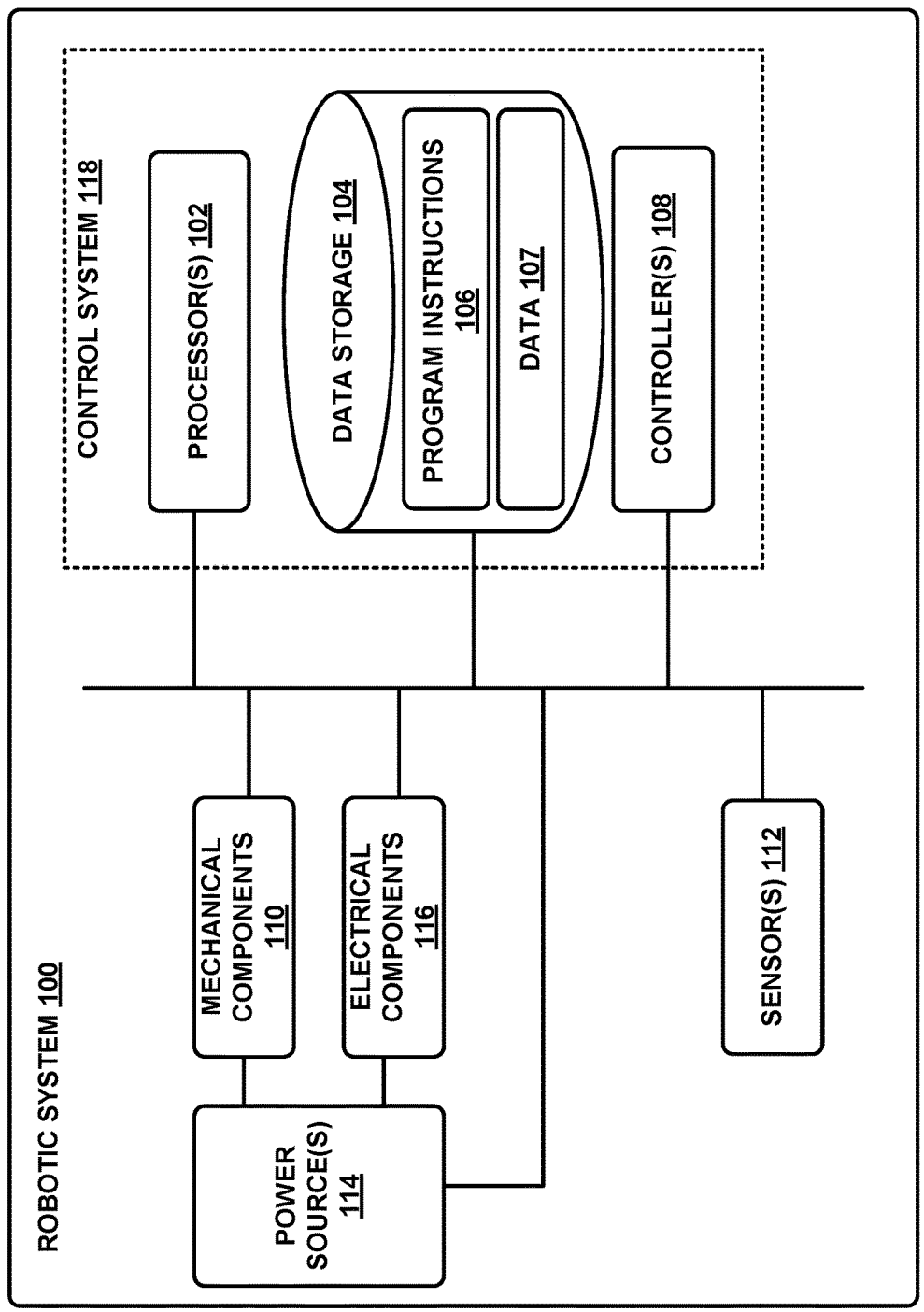
FIG. 1 depicts robotic system, according to example implementations.

FIG. 1 illustrates an example configuration of a robotic system that may be used in connection with the implementations described herein. The robotic system 100 may be configured to operate autonomously, semi-autonomously, and/or using directions provided by user(s). The robotic system 100 may be implemented in various forms, such as a biped robot, quadruped robot, or some other arrangement. Furthermore, the robotic system 100 may also be referred to as a robot, robotic device, or mobile robot, among other designations.

As shown in FIG. 1, the robotic system 100 may include processor(s) 102, data storage 104, and controller(s) 108, which together may be part of a control system 118. The robotic system 100 may also include sensor(s) 112, power source(s) 114, mechanical components 110, and electrical components 116. Nonetheless, the robotic system 100 is shown for illustrative purposes, and may include more or fewer components. The various components of robotic system 100 may be connected in any manner, including wired or wireless connections. Further, in some examples, components of the robotic system 100 may be distributed among multiple physical entities rather than a single physical entity. Other example illustrations of robotic system 100 may exist as well.

Processor(s) 102 may operate as one or more general-purpose hardware processors or special purpose hardware processors (e.g., digital signal processors, application specific integrated circuits, etc.). The processor(s) 102 may be configured to execute computer-readable program instructions 106, and manipulate data 107, both of which are stored in the data storage 104. The processor(s) 102 may also directly or indirectly interact with other components of the robotic system 100, such as sensor(s) 112, power source(s) 114, mechanical components 110, and/or electrical components 116.

The data storage 104 may be one or more types of hardware memory. For example, the data storage 104 may include or take the form of one or more computer-readable storage media that can be read or accessed by processor(s) 102. The one or more computer-readable storage media can include volatile and/or non-volatile storage components, such as optical, magnetic, organic, or another type of memory or storage, which can be integrated in whole or in part with processor(s) 102. In some implementations, the data storage 104 can be a single physical device. In other implementations, the data storage 104 can be implemented using two or more physical devices, which may communicate with one another via wired or wireless communication. As noted previously, the data storage 104 may include the computer-readable program instructions 106 and the data 107. The data 107 may be any type of data, such as configuration data, sensor data, and/or diagnostic data, among other possibilities.

The controller 108 may include one or more electrical circuits, units of digital logic, computer chips, and/or microprocessors that are configured to (perhaps among other tasks), interface between any combination of the mechanical components 110, the sensor(s) 112, the power source(s) 114, the electrical components 116, the control system 118, and/or a user of the robotic system 100. In some implementations, the controller 108 may be a purpose-built embedded device for performing specific operations with one or more subsystems of the robotic device 100.

The control system 118 may monitor and physically change the operating conditions of the robotic system 100. In doing so, the control system 118 may serve as a link between portions of the robotic system 100, such as between mechanical components 110 and/or electrical components 116. In some instances, the control system 118 may serve as an interface between the robotic system 100 and another computing device. Further, the control system 118 may serve as an interface between the robotic system 100 and a user. The instance, the control system 118 may include various components for communicating with the robotic system 100, including a joystick, buttons, and/or ports, etc. The example interfaces and communications noted above may be implemented via a wired or wireless connection, or both. The control system 118 may perform other operations for the robotic system 100 as well.

During operation, the control system 118 may communicate with other systems of the robotic system 100 via wired or wireless connections, and may further be configured to communicate with one or more users of the robot. As one possible illustration, the control system 118 may receive an input (e.g., from a user or from another robot) indicating an instruction to perform a particular gait in a particular direction, and at a particular speed. A gait is a pattern of movement of the limbs of an animal, robot, or other mechanical structure.

Based on this input, the control system 118 may perform operations to cause the robotic device 100 to move according to the requested gait. As another illustration, a control system may receive an input indicating an instruction to move to a particular geographical location. In response, the control system 118 (perhaps with the assistance of other components or systems) may determine a direction, speed, and/or gait based on the environment through which the robotic system 100 is moving en route to the geographical location.

Operations of the control system 118 may be carried out by the processor(s) 102. Alternatively, these operations may be carried out by the controller 108, or a combination of the processor(s) 102 and the controller 108. In some implementations, the control system 118 may partially or wholly reside on a device other than the robotic system 100, and therefore may at least in part control the robotic system 100 remotely.

Mechanical components 110 represent hardware of the robotic system 100 that may enable the robotic system 100 to perform physical operations. As a few examples, the robotic system 100 may include physical members such as leg(s), arm(s), and/or wheel(s). The physical members or other parts of robotic system 100 may further include actuators arranged to move the physical members in relation to one another. The robotic system 100 may also include one or more structured bodies for housing the control system 118 and/or other components, and may further include other types of mechanical components. The particular mechanical components 110 used in a given robot may vary based on the design of the robot, and may also be based on the operations and/or tasks the robot may be configured to perform.

In some examples, the mechanical components 110 may include one or more removable components. The robotic system 100 may be configured to add and/or remove such removable components, which may involve assistance from a user and/or another robot. For example, the robotic system 100 may be configured with removable arms, hands, feet, and/or legs, so that these appendages can be replaced or changed as needed or desired. In some implementations, the robotic system 100 may include one or more removable and/or replaceable battery units or sensors. Other types of removable components may be included within some implementations.

The robotic system 100 may include sensor(s) 112 arranged to sense aspects of the robotic system 100. The sensor(s) 112 may include one or more force sensors, torque sensors, velocity sensors, acceleration sensors, position sensors, proximity sensors, motion sensors, location sensors, load sensors, temperature sensors, touch sensors, depth sensors, ultrasonic range sensors, infrared sensors, object sensors, and/or cameras, among other possibilities. Within some examples, the robotic system 100 may be configured to receive sensor data from sensors that are physically separated from the robot (e.g., sensors that are positioned on other robots or located within the environment in which the robot is operating).

The sensor(s) 112 may provide sensor data to the processor(s) 102 (perhaps by way of data 107) to allow for interaction of the robotic system 100 with its environment, as well as monitoring of the operation of the robotic system 100. The sensor data may be used in evaluation of various factors for activation, movement, and deactivation of mechanical components 110 and electrical components 116 by control system 118. For example, the sensor(s) 112 may capture data corresponding to the terrain of the environment or location of nearby objects, which may assist with environment recognition and navigation. In an example configuration, sensor(s) 112 may include RADAR (e.g., for long-range object detection, distance determination, and/or speed determination), LIDAR (e.g., for short-range object detection, distance determination, and/or speed determination), SONAR (e.g., for underwater object detection, distance determination, and/or speed determination), VICON® (e.g., for motion capture), one or more cameras (e.g., stereoscopic cameras for 3D vision), a global positioning system (GPS) transceiver, and/or other sensors for capturing information of the environment in which the robotic system 100 is operating. The sensor(s) 112 may monitor the environment in real time, and detect obstacles, elements of the terrain, weather conditions, temperature, and/or other aspects of the environment.

Further, the robotic system 100 may include sensor(s) 112 configured to receive information indicative of the state of the robotic system 100, including sensor(s) 112 that may monitor the state of the various components of the robotic system 100. The sensor(s) 112 may measure activity of systems of the robotic system 100 and receive information based on the operation of the various features of the robotic system 100, such the operation of extendable legs, arms, or other mechanical and/or electrical features of the robotic system 100. The data provided by the sensor(s) 112 may enable the control system 118 to determine errors in operation as well as monitor overall operation of components of the robotic system 100.

As an example, the robotic system 100 may use force sensors to measure load on various components of the robotic system 100. In some implementations, the robotic system 100 may include one or more force sensors on an arm or a leg to measure the load on the actuators that move one or more members of the arm or leg. As another example, the robotic system 100 may use one or more position sensors to sense the position of the actuators of the robotic system. For instance, such position sensors may sense states of extension, retraction, or rotation of the actuators on arms or legs.

As another example, the sensor(s) 112 may include one or more velocity and/or acceleration sensors. For instance, the sensor(s) 112 may include an inertial measurement unit (IMU). The IMU may sense velocity and acceleration in the world frame, with respect to the gravity vector. The velocity and acceleration sensed by the IMU may then be translated to that of the robotic system 100 based on the location of the IMU in the robotic system 100 and the kinematics of the robotic system 100.

The robotic system 100 may include other types of sensors not explicated discussed herein. Additionally or alternatively, the robotic system may use particular sensors for purposes not enumerated herein.

The robotic system 100 may also include one or more power source(s) 114 configured to supply power to various components of the robotic system 100. Among other possible power systems, the robotic system 100 may include a hydraulic system, electrical system, batteries, and/or other types of power systems. As an example illustration, the robotic system 100 may include one or more batteries configured to provide charge to components of the robotic system 100. Some of the mechanical components 110 and/or electrical components 116 may each connect to a different power source, may be powered by the same power source, or be powered by multiple power sources.

Any type of power source may be used to power the robotic system 100, such as electrical power or a gasoline engine. Additionally or alternatively, the robotic system 100 may include a hydraulic system configured to provide power to the mechanical components 110 using fluid power. Components of the robotic system 100 may operate based on hydraulic fluid being transmitted throughout the hydraulic system to various hydraulic motors and hydraulic cylinders, for example. The hydraulic system may transfer hydraulic power by way of pressurized hydraulic fluid through tubes, flexible hoses, or other links between components of the robotic system 100. The power source(s) 114 may charge using various types of charging, such as wired connections to an outside power source, wireless charging, combustion, or other examples.

The electrical components 116 may include various mechanisms capable of processing, transferring, and/or providing electrical charge or electric signals. Among possible examples, the electrical components 116 may include electrical wires, circuitry, and/or wireless communication transmitters and receivers to enable operations of the robotic system 100. The electrical components 116 may interwork with the mechanical components 110 to enable the robotic system 100 to perform various operations. The electrical components 116 may be configured to provide power from the power source(s) 114 to the various mechanical components 110, for example. Further, the robotic system 100 may include electric motors. Other examples of electrical components 116 may exist as well.

Although not shown in FIG. 1, the robotic system 100 may include a body, which may connect to or house appendages and components of the robotic system. As such, the structure of the body may vary within examples and may further depend on particular operations that a given robot may have been designed to perform. For example, a robot developed to carry heavy loads may have a wide body that enables placement of the load. Similarly, a robot designed to reach high speeds may have a narrow, small body that does not have substantial weight. Further, the body and/or the other components may be developed using various types of materials, such as metals or plastics. Within other examples, a robot may have a body with a different structure or made of various types of materials.

The body and/or the other components may include or carry the sensor(s) 112. These sensors may be positioned in various locations on the robotic device 100, such as on the body and/or on one or more of the appendages, among other examples.

On its body, the robotic device 100 may carry a load, such as a type of cargo that is to be transported. The load may also represent external batteries or other types of power sources (e.g., solar panels) that the robotic device 100 may utilize. Carrying the load represents one example use for which the robotic device 100 may be configured, but the robotic device 100 may be configured to perform other operations as well.

As noted above, the robotic system 100 may include various types of legs, arms, wheels, and so on. In general, the robotic system 100 may be configured with zero or more legs. An implementation of the robotic system with zero legs may include wheels, treads, or some other form of locomotion. An implementation of the robotic system with two legs may be referred to as a biped, and an implementation with four legs may be referred as a quadruped. Implementations with six or eight legs are also possible. For purposes of illustration, biped and quadruped implementations of the robotic system 100 are described below.

Figure 2:
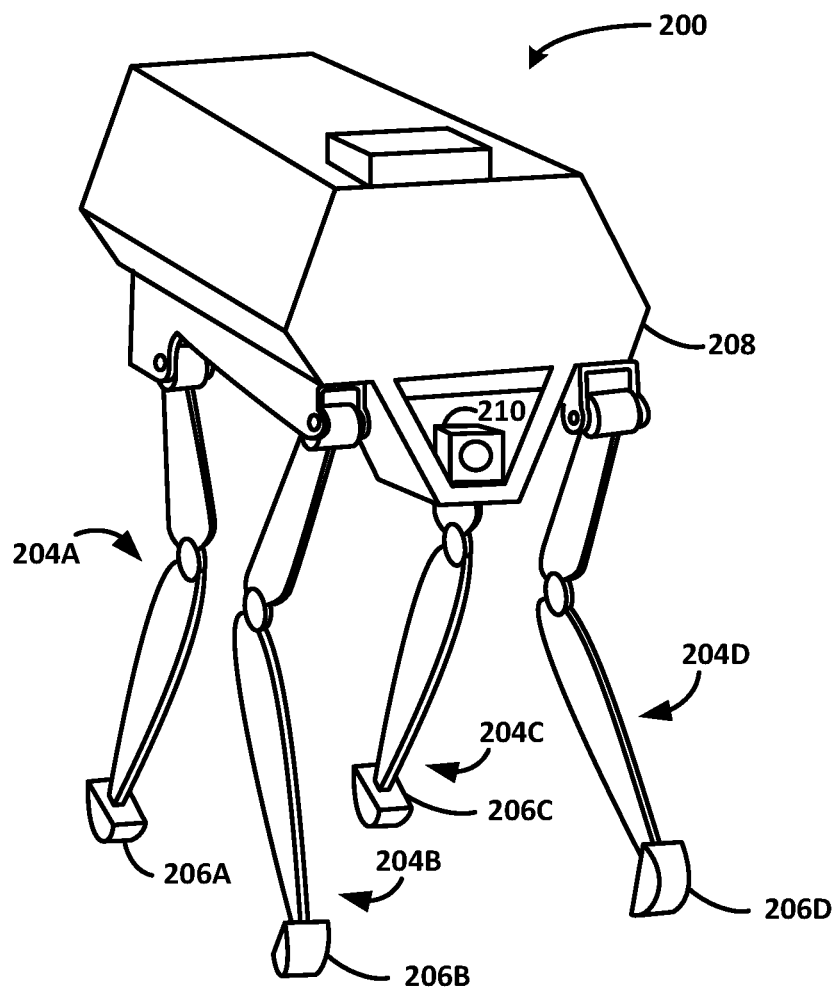
FIG. 2 depicts a quadruped robot, according to example implementations.

FIG. 2 illustrates a quadruped robot 200, according to an example implementation. Among other possible features, the robot 200 may be configured to perform some of the operations described herein. The robot 200 includes a control system, and legs 204A, 204B, 204C, 204D connected to a body 208. Each leg may include a respective foot 206A, 206B, 206C, 206D that may contact a surface (e.g., a ground surface). Further, the robot 200 is illustrated with sensor(s) 210, and may be capable of carrying a load on the body 208. Within other examples, the robot 200 may include more or fewer components, and thus may include components not shown in FIG. 2.

The robot 200 may be a physical representation of the robotic system 100 shown in FIG. 1, or may be based on other configurations. Thus, the robot 200 may include one or more of mechanical components 110, sensor(s) 112, power source(s) 114, electrical components 116, and/or control system 118, among other possible components or systems.

The configuration, position, and/or structure of the legs 204A-204D may vary in example implementations. The legs 204A-204D enable the robot 200 to move relative to its environment, and may be configured to operate in multiple degrees of freedom to enable different techniques of travel. In particular, the legs 204A-204D may enable the robot 200 to travel at various speeds according to the mechanics set forth within different gaits. The robot 200 may use one or more gaits to travel within an environment, which may involve selecting a gait based on speed, terrain, the need to maneuver, and/or energy efficiency.

Further, different types of robots may use different gaits due to variations in design. Although some gaits may have specific names (e.g., walk, trot, run, bound, gallop, etc.), the distinctions between gaits may overlap. The gaits may be classified based on footfall patterns—the locations on a surface for the placement the feet 206A-206D. Similarly, gaits may also be classified based on ambulatory mechanics.

The body 208 of the robot 200 connects to the legs 204A-204D and may house various components of the robot 200. For example, the body 208 may include or carry sensor(s) 210. These sensors may be any of the sensors discussed in the context of sensor(s) 112, such as a camera, LIDAR, or an infrared sensor. Further, the locations of sensor(s) 210 are not limited to those illustrated in FIG. 2. Thus, sensor(s) 210 may be positioned in various locations on the robot 200, such as on the body 208 and/or on one or more of the legs 204A-204D, among other examples.

Figure 3:
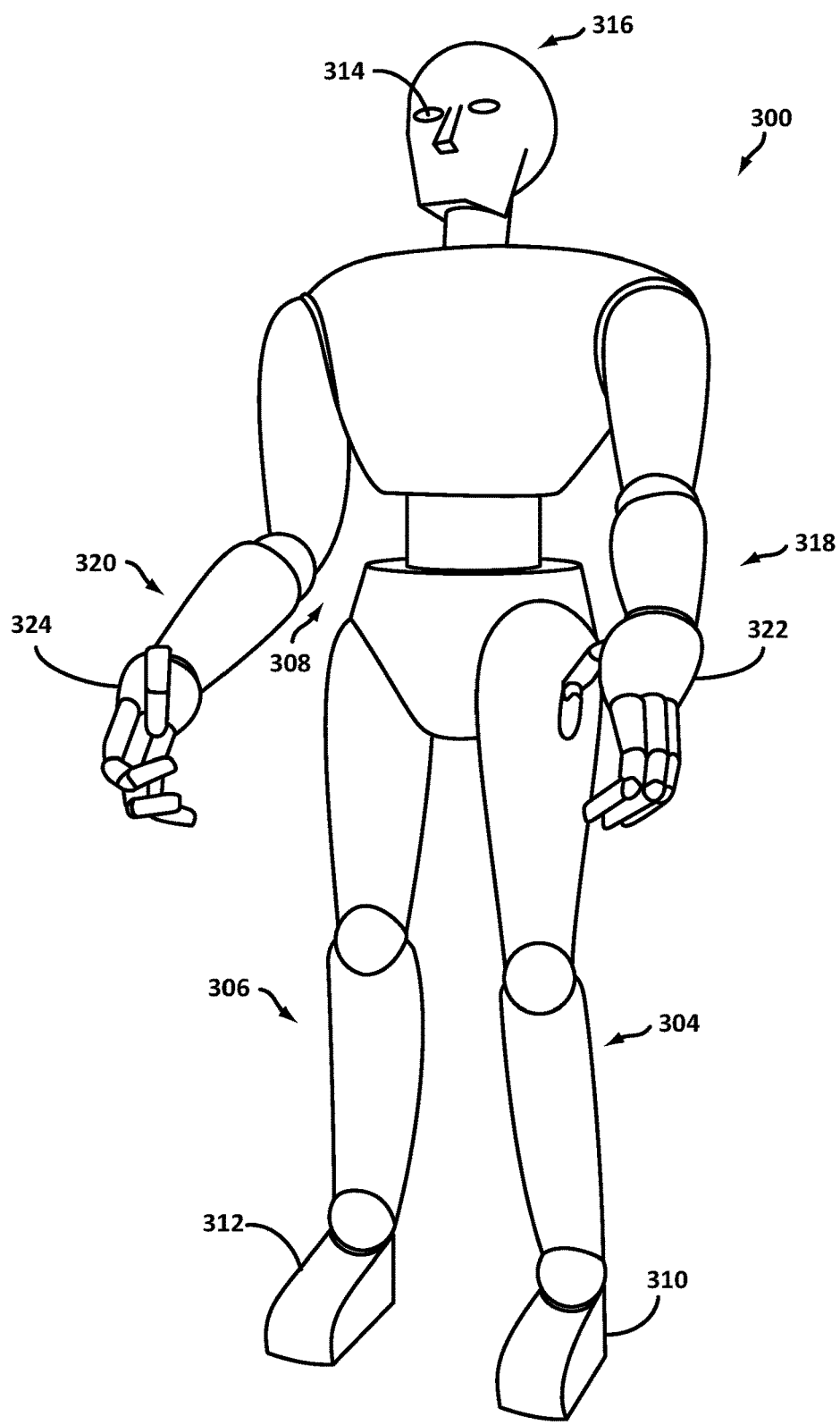
FIG. 3 depicts a biped robot, according to example implementations.

FIG. 3 illustrates a biped robot 300 according to another example implementation. Similar to robot 200, the robot 300 may correspond to the robotic system 100 shown in FIG. 1, and may be configured to perform some of the implementations described herein. Thus, like the robot 200, the robot 300 may include one or more of mechanical components 110, sensor(s) 112, power source(s) 114, electrical components 116, and/or control system 118.

For example, the robot 300 may include legs 304 and 306 connected to a body 308. Each leg may consist of one or more members connected by joints and configured to operate with various degrees of freedom with respect to one another. Each leg may also include a respective foot 310 and 312, which may contact a surface (e.g., the ground surface). Like the robot 200, the legs 304 and 306 may enable the robot 300 to travel at various speeds according to the mechanics set forth within gaits. The robot 300, however, may utilize different gaits from that of the robot 200, due at least in part to the differences between biped and quadruped capabilities.

The robot 300 may also include arms 318 and 320. These arms may facilitate object manipulation, load carrying, and/or balancing for the robot 300. Like legs 304 and 306, each arm may consist of one or more members connected by joints and configured to operate with various degrees of freedom with respect to one another. Each arm may also include a respective hand 322 and 324. The robot 300 may use hands 322 and 324 for gripping, turning, pulling, and/or pushing objects. The hands 322 and 324 may include various types of appendages or attachments, such as fingers, grippers, welding tools, cutting tools, and so on.

The robot 300 may also include sensor(s) 314, corresponding to sensor(s) 112, and configured to provide sensor data to its control system. In some cases, the locations of these sensors may be chosen in order to suggest an anthropomorphic structure of the robot 300. Thus, as illustrated in FIG. 3, the robot 300 may contain vision sensors (e.g., cameras, infrared sensors, object sensors, range sensors, etc.) within its head 316.

2. EXAMPLE GAITS OF LEGGED ROBOTS

This section describes example gaits of legged robots. Although quadruped gaits are described for purpose of example, the implementations herein can support gaits of robots with varying numbers of legs, including bipeds, tripods, hexapods, etc. Gaits can differ in a variety of ways, and different gaits may produce different styles of locomotion.

As noted above, a gait of a robot may encompass a cyclic pattern of leg movements that produce locomotion through a sequence of foot contacts with a surface (e.g., a ground surface). Additionally, acyclic gaits define transitions of the robot's locomotion between two gaits, and recovery gaits define touchdown timings and positions for the feet that cause the legged robot to recover from deviations from a cyclic or acyclic gait.

Quadruped robots may support a number of gaits including, but not limited to, standing, walking, trotting, pacing, pronking, cantering, galloping, and bounding. Each of these gaits involves a different pattern of foot placements on a surface and timings thereof. In order to achieve a particular gait, the robot may be instructed to actuate its leg members and/or leg joints in accordance with the particular gait.

For purposes of simplicity, three example cyclic quadruped gaits are described in detail below: standing, walking, and trotting. Nonetheless, quadruped robots may support other gaits, and may also support multiple variations of gaits. For instance, a robot may support various combinations of velocities (e.g., 1.5 miles per hour (MPH), 2.0 MPH, 2.5 MPH, 3.0 MPH, 3.5 MPH, etc.) and directions (e.g., forward, sidestep left, sidestep right, backward, etc.) for a walking gait. Despite their similarities, the walking gaits for each velocity may be considered to be different gaits. The velocities discussed herein may be center-of-mass (COM) velocities of a robot measured by, for instance, an IMU. These velocities may be a combination of x-direction and y-direction velocities, such as a speed and angle representation of a velocity vector. But other types of velocities (and/or velocity sensors) may be used.

A stand gait may be considered to be a "gait" of a quadruped, even though the robot's velocity is expected to be at or near zero when standing. Further, a standing quadruped has all four of its feet in contact with a surface. In some situations, a standing quadruped may exhibit some nominal velocity. For example, the quadruped may need to exert force to correct its balance, and/or move its center of mass (COM) in one direction or another to maintain a particular stance. Thus, a quadruped may be considered to be standing even if its velocity is less than a particular threshold, such as 0.1 MPH.

A walk may involve the quadruped moving at a velocity of approximately 0.5 to 5.5 MPH, though slower and/or faster walks may be possible. An example leg movement sequence for a walking quadruped is moving the left rear leg, then the left front leg, then the right rear leg, and then the right front leg in a four-beat pattern. The quadruped may alternate between having two and three of its feet in contact with a surface at any given time.

Figure 4:
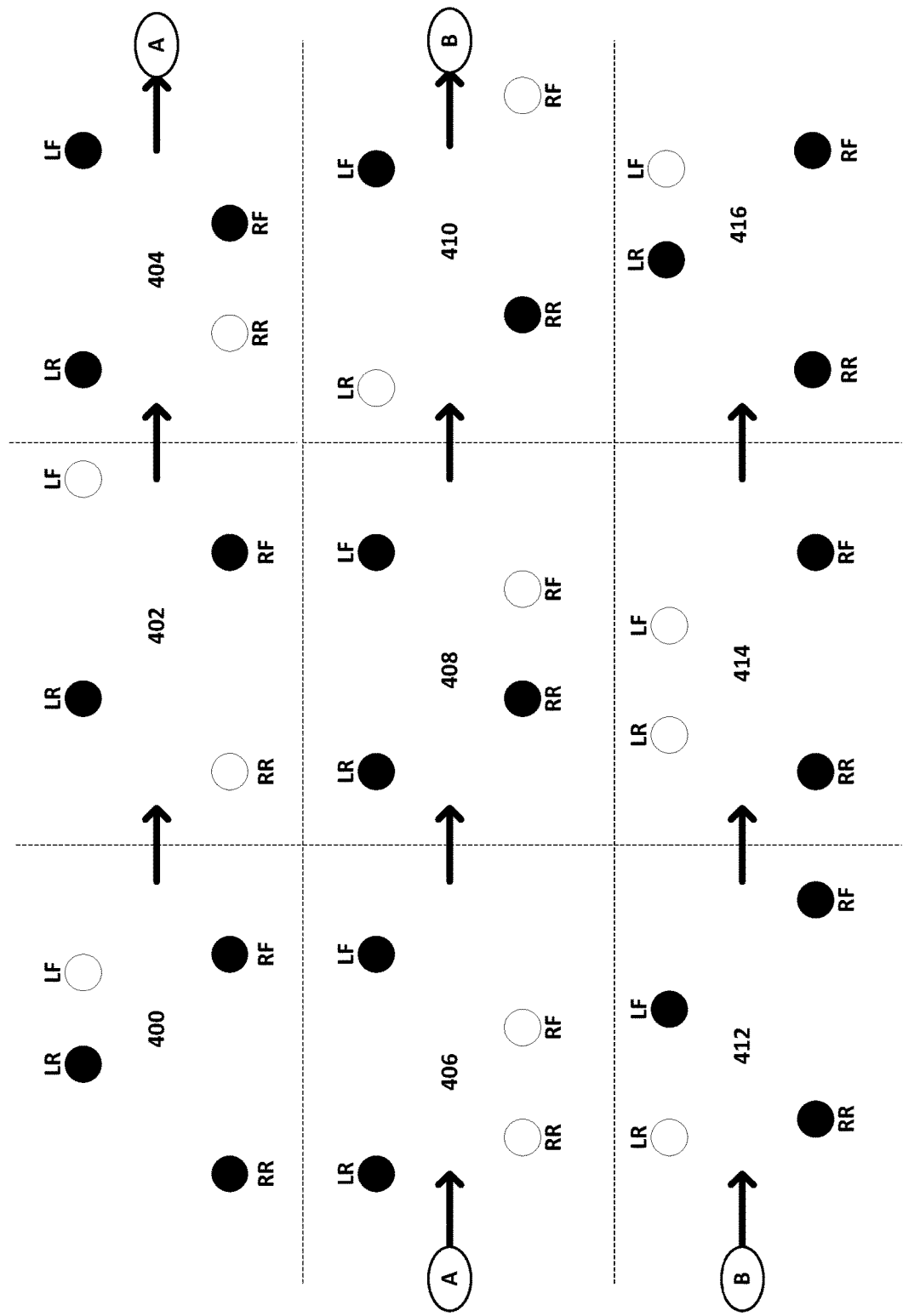
FIG. 4 depicts a sequence of footfall patterns for a walk gait of a quadruped robot, according to example implementations.

An example sequence of footfall patterns for a walking quadruped is shown in FIG. 4. In each pattern 400, 402, 404, 406, 408, 410, 412, 414, and 416, a foot of the quadruped that is in contact with the surface is represented with a solid black circle. A foot that is not in contact with the surface (e.g., in a swing phase) is represented as a white circle with a black outline. Further, the abbreviations LF, RF, LR and RR represent the quadruped's left front foot, right front foot, left rear foot, and right rear foot, respectively. Additionally, the quadruped is assumed to be moving to the right in each pattern of FIG. 4.

Starting at pattern 400, the quadruped has its right front, left rear, and right rear feet on the surface, while its left front foot is swinging. In pattern 402, the left front foot continues to swing while the right rear foot is lifted off the surface and begins to swing. In pattern 404, the left front foot touches down while the right rear foot continues its swing. In pattern 406, the right front foot lifts off while the right rear foot again continues its swing. In pattern 408, the right rear foot touches down while the right front foot continues its swing. In pattern 410, the left rear foot lifts off while the right front foot continues its swing. In pattern 412, the right front foot touches down while the left rear foot continues its swing. In pattern 414, the left front foot lifts off while the left rear foot continues its swing. In pattern 416, the left rear foot touches down while the left front foot continues its swing.

Notably, pattern 416 may be identical or similar to pattern 400. Thus, the sequence of patterns 400, 402, 404, 406, 408, 410, 412, 414, and 416 may repeat as the robot walks. Regardless, the number of feet in contact with the surface at any one time is either 2 or 3.

A trot may involve the quadruped moving at a velocity of approximately 1.0 MPH to 10 MPH, though slower and/or faster trots may be possible. One possible characteristic of a trot is that diagonal pairs of feet are moved in unison according to a two beat pattern.

Figure 5A:
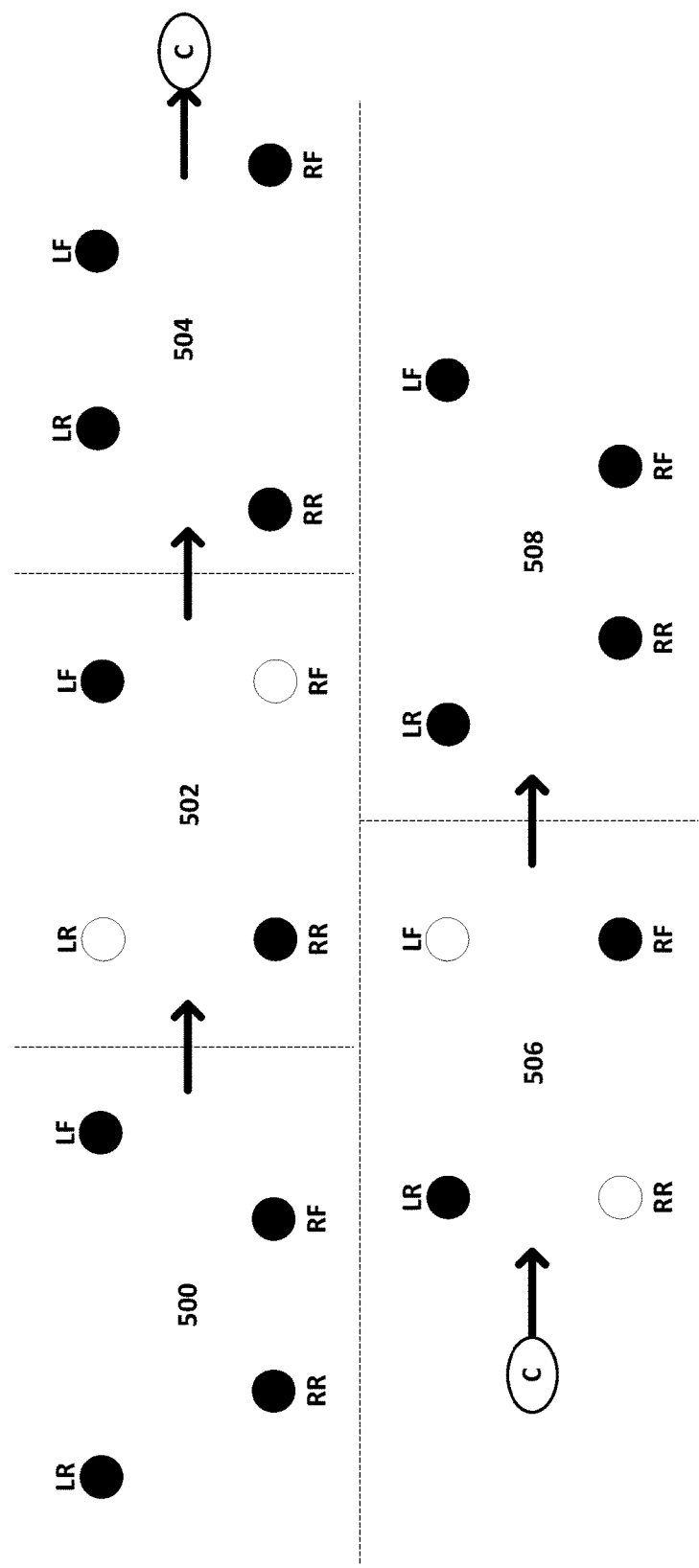
FIG. 5A depicts a sequence of footfall patterns for a trot gait of a quadruped robot, according to example implementations.
Figure 5B:
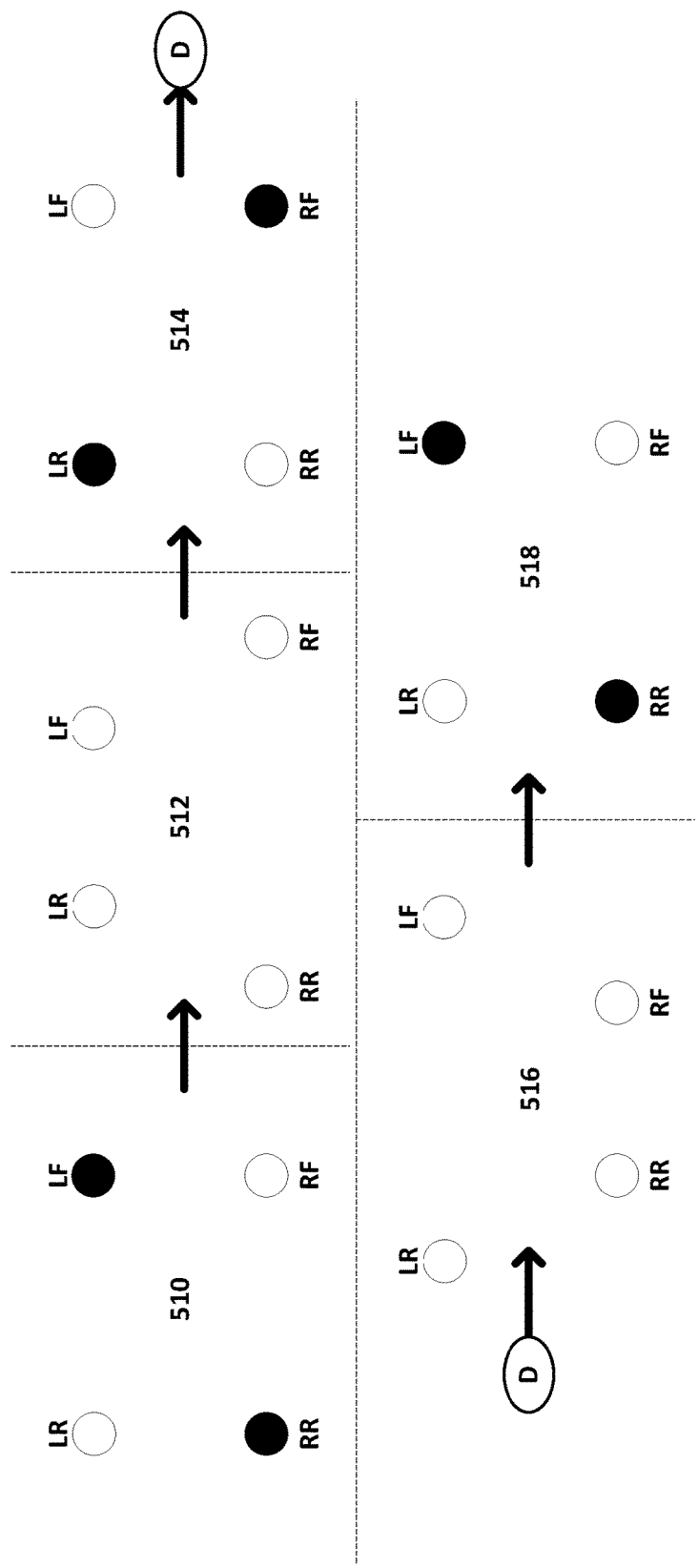
FIG. 5B depicts another sequence of footfall patterns for a trot gait of a quadruped robot, according to example implementations.

Example sequences of footfall patterns for a trotting quadruped are shown in FIGS. 5A and 5B. FIG. 5A shows a trotting footfall pattern sequence in which all four feet can be on the surface simultaneously, and FIG. 5B shows a trotting footfall pattern sequence in which all four feet can be off the surface simultaneously. For sake of convenience, the trotting footfall pattern sequence of FIG. 5A may be referred to as a "slow trot," while the trotting footfall pattern sequence of FIG. 5B may be referred to as a "fast trot."

Starting at pattern 500 of FIG. 5A, the quadruped has all four of its feet on the surface. In pattern 502, the right front and left rear feet are lifted off the surface and begin to swing. In pattern 504, all four feet are again on the surface, but in an arrangement that is the mirror image of pattern 500. In pattern 506, the left front and right rear feet are lifted off the surface and being to swing. In pattern 508, all four feet are once more on the surface.

Notably, pattern 508 may be identical or similar to pattern 500. Thus, the sequence of patterns 500, 502, 504, 506, and 508 may repeat as the robot walks. Regardless, the number of feet in contact with the surface at any one time is either 2 or 4.

Starting at pattern 510 of FIG. 5B, the quadruped has its left front and right rear feet on the surface, while its right front and left rear feet are swinging. In pattern 512, the left front and right rear feet are lifted off the surface, and all four feet are swinging. In pattern 514, the right front and left rear feet touch down, while the left front and right rear feet are still swinging. In pattern 516, the right front and left rear feet are lifted off the surface, and all four feet are swinging. In pattern 518, the left front and right rear feet touch down while the right front and left rear feet are swinging.

Notably, pattern 518 may be identical or similar to pattern 510. Thus, the sequence of patterns 510, 512, 514, 516, and 518 may repeat as the robot walks. Regardless, the number of feet in contact with the surface at any one time is either 0 or 2.

The patterns of FIGS. 4, 5A, and 5B are nominal, in the sense that they may change based on the robot's state or environment. For instance, a robot may accelerate or delay the touchdown of a foot to accommodate a rise or dip in the surface. Further, a robot may alter its gait to account for a disruption to its COM, or to avoid an obstacle. Thus, the gait patterns of these figures are merely for purposes of example, and not intended to limit the implementations herein.

In addition to walking and trotting a quadruped may support other gaits, such as pacing, pronking, cantering, galloping, bounding, and so on. Further, the quadruped may support moving in various directions according to its supported gaits, such as forward, backward, sidestepping left, and sidestepping right.

These additional gaits are briefly described as follows. Pacing gaits may involve either no feet being in contact with a surface or exactly two feet on the same side of the robot being in contact with the surface. Pronking gaits may involve either no feet or all four feet being in contact with a surface in a repeated jumping pattern. Cantering gaits may involve either zero, exactly one, exactly two, or exactly three feet being in contact with a surface in the following pattern: a first rear foot touches down, then the second rear foot and a first front foot touches down, then the first rear foot lifts, then the second front foot touches down, then the second rear foot and the first front foot lift, then the second front foot lifts. Galloping gaits are similar to cantering gaits, except that the second rear foot and first front foot do not touch down simultaneously—the second rear foot touches down slightly before the first front foot. Bounding gaits may involve either no feet being in contact with a surface or just the two front feet or the two rear feet being in contact with the surface. Additionally, other gaits may be defined for robots, and one or more variations of any gait may also be defined.

As noted above, the quadruped may also support acyclic gaits that define footfall patterns that transition the quadruped between two gaits, such as two cyclic gaits. Unlike cyclic gaits which may repeat for an arbitrary period of time, transitions are finite behaviors that switch between gaits. For two gaits that have intersecting states (e.g., a particular robot state in terms of joint angles of the robot's legs exists in both gaits) transitioning between the gaits may involve an instantaneous switch from one gait to the other during one of these intersecting states. But if two gaits do not have intersecting states, the transition may continue locomotion, but change the robot's parameters from one gait to another over a finite period of time, while keeping the robot in valid states throughout the transition.

Also as noted above, the quadruped may support recovery gaits that define footfall patterns that cause the legged robot to recover from deviations from a cyclic or acyclic gait. For instance, if the quadruped departs from a cyclic or acyclic gait, perhaps due to a collision with an object or attempted avoidance of such a collision, the quadruped may adopt a recovery gait. In some cases, a recovery gait may involve swinging a leg faster or slower than normal, as long as the robot remains within a valid state. If such a leg were to move faster than normal, it would touch down earlier. This may help place the quadruped in a different gait than it was previously. Alternatively, if a leg is slowed or paused, the quadruped may also be able to adopt a different gait.

3. EXAMPLE GAIT CONTROLLERS AND ORDERED LISTS THEREOF

Given that some robots may support a large number of gaits and variations thereof, software modules to support these gaits may be organized into discrete gait controllers. Each gait controller may map the robot's instantaneous state to output parameters, and may be associated with zero or more validity checks. The state of the robot may include the robot's velocity (e.g., COM velocity) and position, as well as joint angles and joint torques for the legs of the robot, for instance. This state may be sensed by, for example, an IMU, joint angle sensors, and/or actuators among other possibilities. The output parameters may include prospective footstep locations, as well as desired joint torques and/or joint angles of the robot's legs so that the robot can achieve the prospective footstep locations over a particular time horizon (e.g., the next 1-5 seconds).

A validity check associated with a gait controller is a test to make sure that the robot is capable of achieving the desired gait based on its current state. As an example, if a robot is running, it might not be able to immediately transition to a standing gait without a loss of stability (e.g., the robot will fall over). In addition to the velocity of the robot, the validity checks may include the number of feet in contact with a surface, that the robot's pitch and roll are within certain bounds, and that the gait will not lead to the robot attempting to place one or more of its feet in unobtainable positions. For instance, a validity check may verify that the gait will not cause any of the robot's legs to collide with one another.

For each possible target gait, gait controllers may be ordered in a list such that the gait controller for the target gait is at the beginning (e.g., the top) of the list. Further, additional gait controllers for other gaits may be placed in the list to evolve the robot's state such that higher priority controllers are likely to pass their domain checks.

Figure 6A:
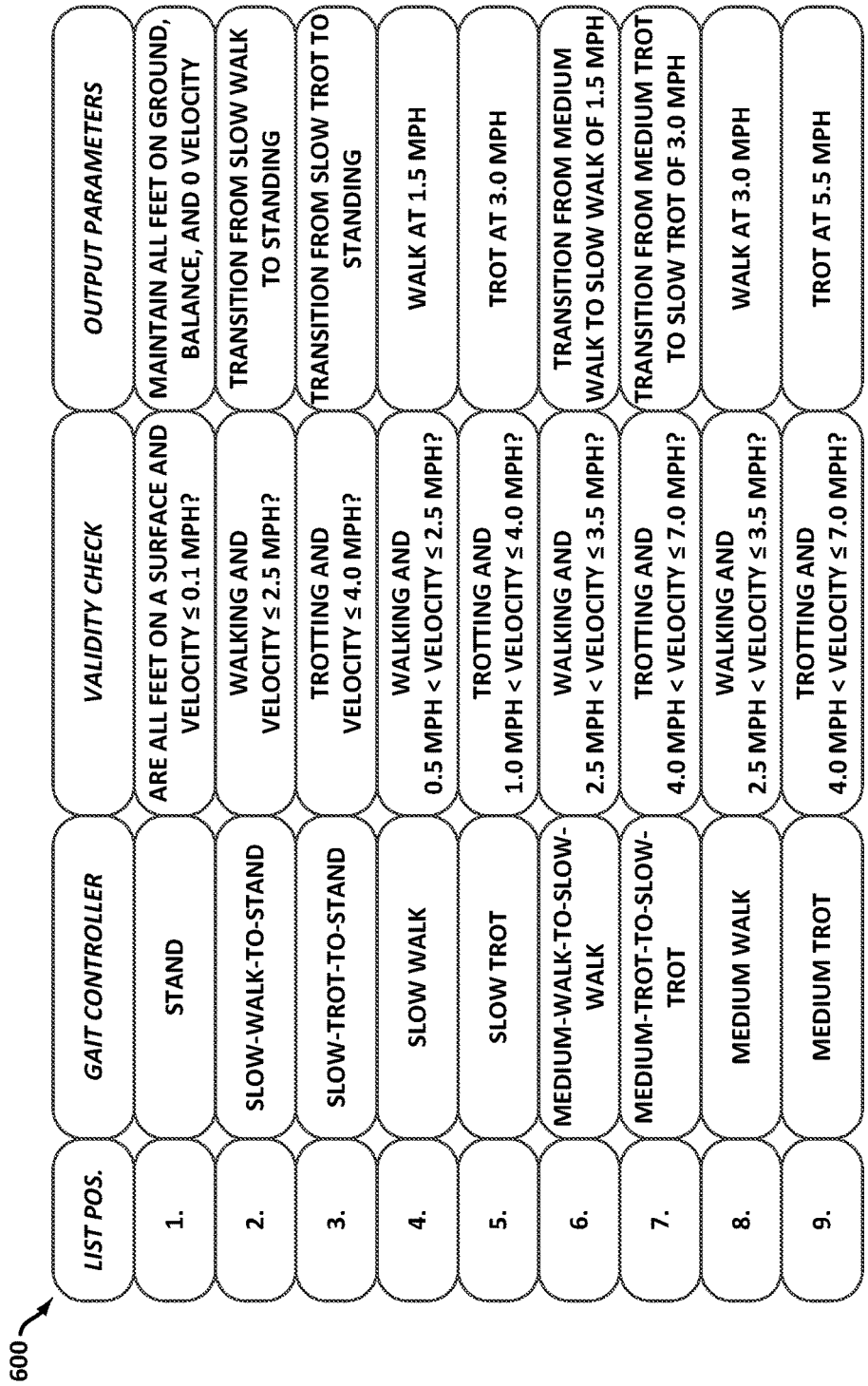
FIG. 6A depicts a list of gait controllers, according to example implementations.

As an illustrative example, FIG. 6A depicts a list 600 for a target gait of standing (which will be referred to as the "stand list"). In FIG. 6A, nine gait controllers are ordered in a list 600, starting with the stand gait controller. Thus, the robot may be operating according to any of the defined gaits, and the robot may have decided, or been instructed, to stand. As a result, the stand gait is the target gait. For purposes of simplicity, the robot is assumed to support four cyclic gaits in addition to standing: a slow walk at 1.5 MPH, a slow trot of 3.0 MPH, a medium walk at 3.0 MPH, and a medium trot at 5.5 MPH. The robot is also assumed to support four acyclic gaits: slow-walk-to-stand, slow-trot-to-stand, medium-walk-to-slow-walk, and medium-trot-to-slow-trot.

In full generality, a robot may support any number of gaits. For instance, stand list 600 of FIG. 6A may include up to 10 or more walking gaits of various velocities, as well as up to 10 or more trotting gaits of various speeds. In some cases, the respective velocities may be close to one another to facilitate smooth transitions between the gaits. As an example, walking gaits at 0.5 MPH, 1.0 MPH, 2.0 MPH, 2.5 MPH, 3.0 MPH, 3.5 MPH, 4.0 MPH, and 4.5 MPH may be defined. Further, acyclic gaits transitioning between various pairs of these walking gaits may be defined.

Not shown in FIG. 6A are gait controllers for additional gaits, such as canter, gallop, and bound, as well as recovery gaits. However, these omissions were made in order to simplify FIG. 6A. A stand list in accordance with the implementations herein may include any number of gait controllers (e.g., dozens, hundreds, etc.).

If a robot is in any of the non-standing gaits, stand list 600 of FIG. 6A can be used to incrementally instruct the robot to smoothly attain the stand gait. Starting at the beginning of stand list 600 (list position 1), the list may be traversed in order. For each gait controller, the associated validity check is performed. If the validity check passes, then the robot is instructed to operate according to the gait controller's output parameters. If the validity check fails, then the next gait controller in the list is evaluated accordingly, until a valid gait controller is found.

In FIG. 6A the validity checks are related to the instantaneous state and velocity of the robot for purposes of simplicity. In full generality, other validity checks may be included. Further, each gait controller list may include a default controller in the last position of the list. This final gait controller instructs the robot to operate according to a fallback behavior if the validity checks of all other gait controllers fail. For instance, the gait controller at the end of the stand list may have no associated validity checks (so that the associated gait is always valid) and the output parameters may effectively lock the joint positions of the robot. While this behavior might not be ideal in some situations, it provides a behavior for the robot when all other gait controllers fail.

An algorithmic process for traversing a list of gait controllers will be presented below in the context of FIG. 8. But for purposes of presenting stand list 600, the following high-level examples are provided. In both examples, the stand list 600 is traversed from the beginning until an appropriate gait controller is determined.

In one example, if a robot is operating according to the slow walk gait of 1.5 MPH, the validity check of the stand gait controller is tested first, but fails. However, the validity check of the slow-walk-to-stand gait controller will pass, because the robot is walking (e.g., with 2 or 3 feet on the surface) at less than 2.5 MPH. The output parameters of the slow-walk-to-stand gait controller instruct the robot to operate according to the slow-walk-to-stand-gait, which transitions the robot to standing. Stand list 600 is traversed again from the beginning and this time the validity check for the stand gait controller passes, because the robot is standing (all four feet on the surface with little or no velocity). Thus, the desired stand gait is achieved In another example, if the robot is operating according to the medium trot gait, stand list 600 instructs the robot to switch to the medium-trot-to-slow-trot gait. Once in the medium-trot-to-slow-trot gait, stand list 600 instructs the robot to operate according to the slow trot gait. Once in the slow trot gait, stand list 600 instructs the robot to operate according to the slow-trot-to-stand gait. Once in the slow-trot-to-stand gait, stand list 600 instructs the robot to operate according to the stand gait.

In general, any particular gait controller (but not the target gait controller) is operable to change the state of the robot such that the changed state at least partially satisfies the validity check of one or more gait controllers that appear in the list before the particular gait controller. In this way, each list may also be represented as a hierarchy of gait controllers.

Figure 6B:
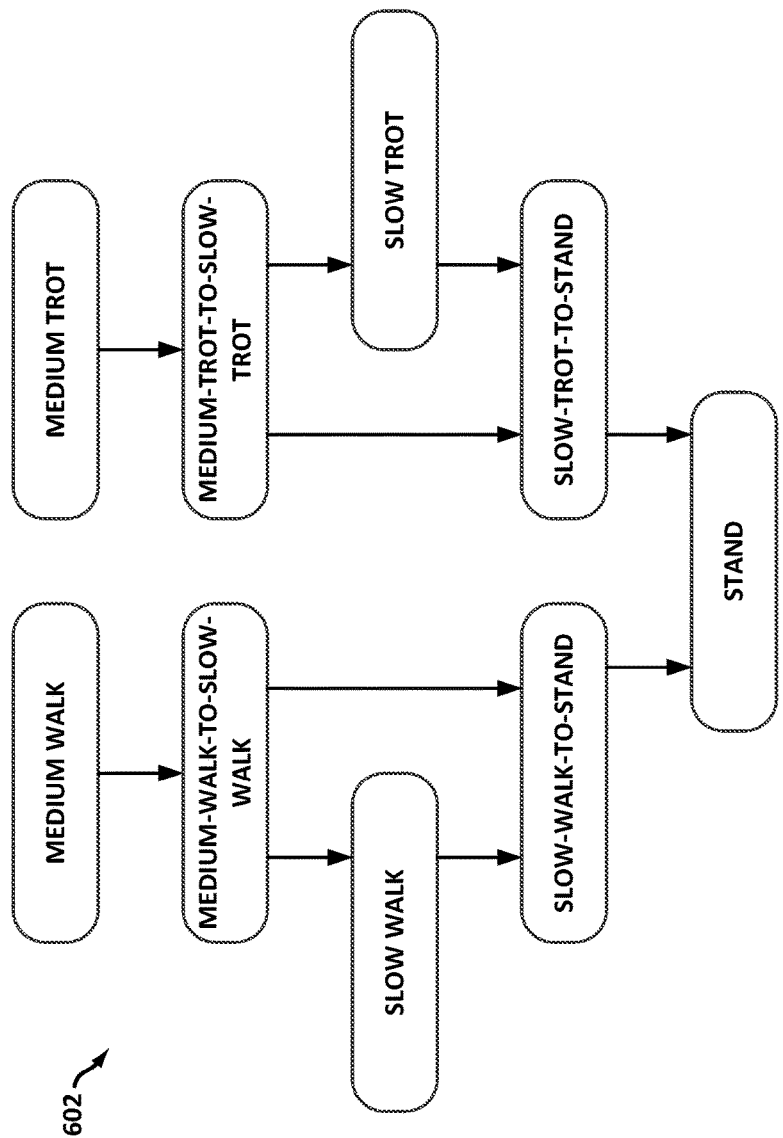
FIG. 6B depicts a hierarchical view of the gait controllers of FIG. 6A, according to example implementations.

For instance, FIG. 6B presents a hierarchical view of stand list 600. In particular, hierarchy 602 illustrates how a robot operating according to any gait in stand list 600 can transition to the stand gait. As just one example, a robot operating according to the medium walk gait may transition to the acyclic medium-walk-to-slow-walk gait, then to the slow walk gait, then to the slow-walk-to-stand gait, and then to the stand gait. As noted above, an algorithmic process for traversing a list of gait controllers will be presented below in the context of FIG. 8.

FIG. 6B indicates that a robot can switch directly from the medium-walk-to-slow-walk gait to the slow-walk-to-stand gait without operating according to the slow walk gait. Similarly, a robot can switch directly from the medium-trot-to-slow-trot gait to the slow-trot-to-stand gait without operating according to the slow trot gait. In some implementations, however, acyclic gaits always transition between pairs of cyclic gaits, and thus transitioning directly from one acyclic gait to another might not be supported. Instead, between acyclic gaits, the robot may spend at least a nominal amount of time (e.g., a few milliseconds or more) operating according to a cyclic gait.

Figure 7A:
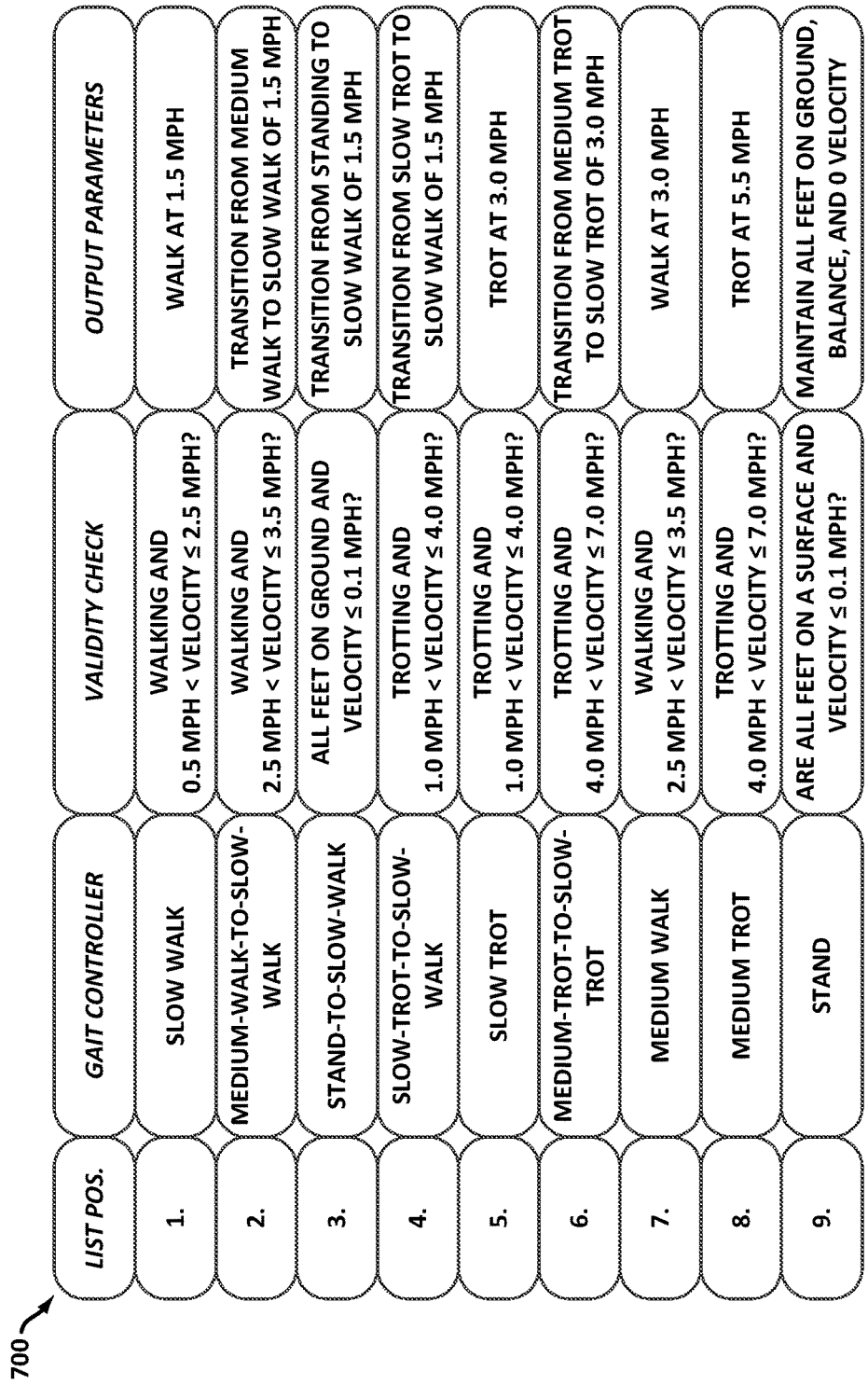
FIG. 7A depicts another list of gait controllers, according to example implementations.

As another illustrative example, FIG. 7A depicts a list 700 for a target gait of slow walk (which will be referred to as the "slow walk list"). In FIG. 7A, nine gait controllers are ordered starting with the slow walk gait controller. Thus, the robot may be operating according to any gait, and the robot may have decided, or been instructed, to operate according to the slow walk gait. Therefore, the slow walk gait is the target gait. The robot is assumed to support four cyclic gaits in addition to slow walk: standing with a substantive zero velocity, a slow trot of 3.0 MPH, a medium walk at 3.0 MPH, and a medium trot at 5.5 MPH. The robot is also assumed to support four acyclic gaits: medium-walk-to-slow-walk, stand-to-slow-walk, slow-trot-to-slow-walk, and medium-trot-to-slow-trot. Other gaits not shown in FIG. 7A may also be supported.

Like FIG. 6A, in FIG. 7A the validity checks are related to the instantaneous state and velocity of the robots for purposes of simplicity. In full generality, other validity checks may be included.

Figure 7B:
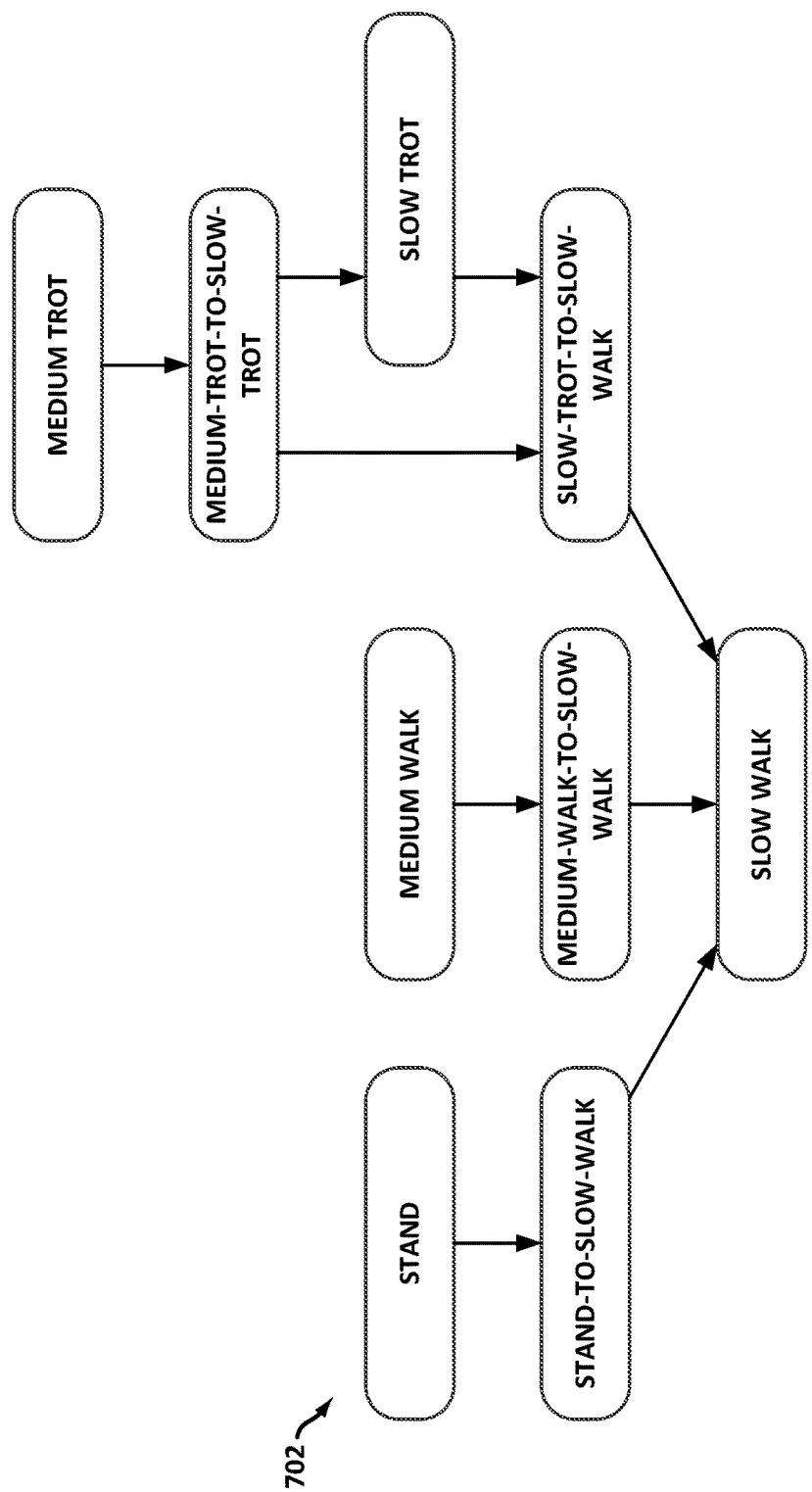
FIG. 7B depicts a hierarchical view of the gait controllers of FIG. 7A, according to example implementations.

As was the case for the stand list, any particular gait controller (but not the target gait controller) is operable to change the state of the robot so that the changed state at least partially satisfies the validity check of one or more gait controllers that appear in the list before the particular gait controller. To that point, FIG. 7B presents a hierarchical view of slow walk list 700. In particular, hierarchy 702 illustrates how a robot operating according to any cyclic gait in slow walk list 700 can transition to the slow walk gait. As just one example, a robot operating according to the medium trot gait may transition to the acyclic medium-trot-to-slow-trot gait, then to the slow trot gait, then to the slow-trot-to-slow-walk gait, and then to the slow walk gait.

4. EXAMPLE TRAVERSAL OF A LIST OF GAIT CONTROLLERS

Figure 8:
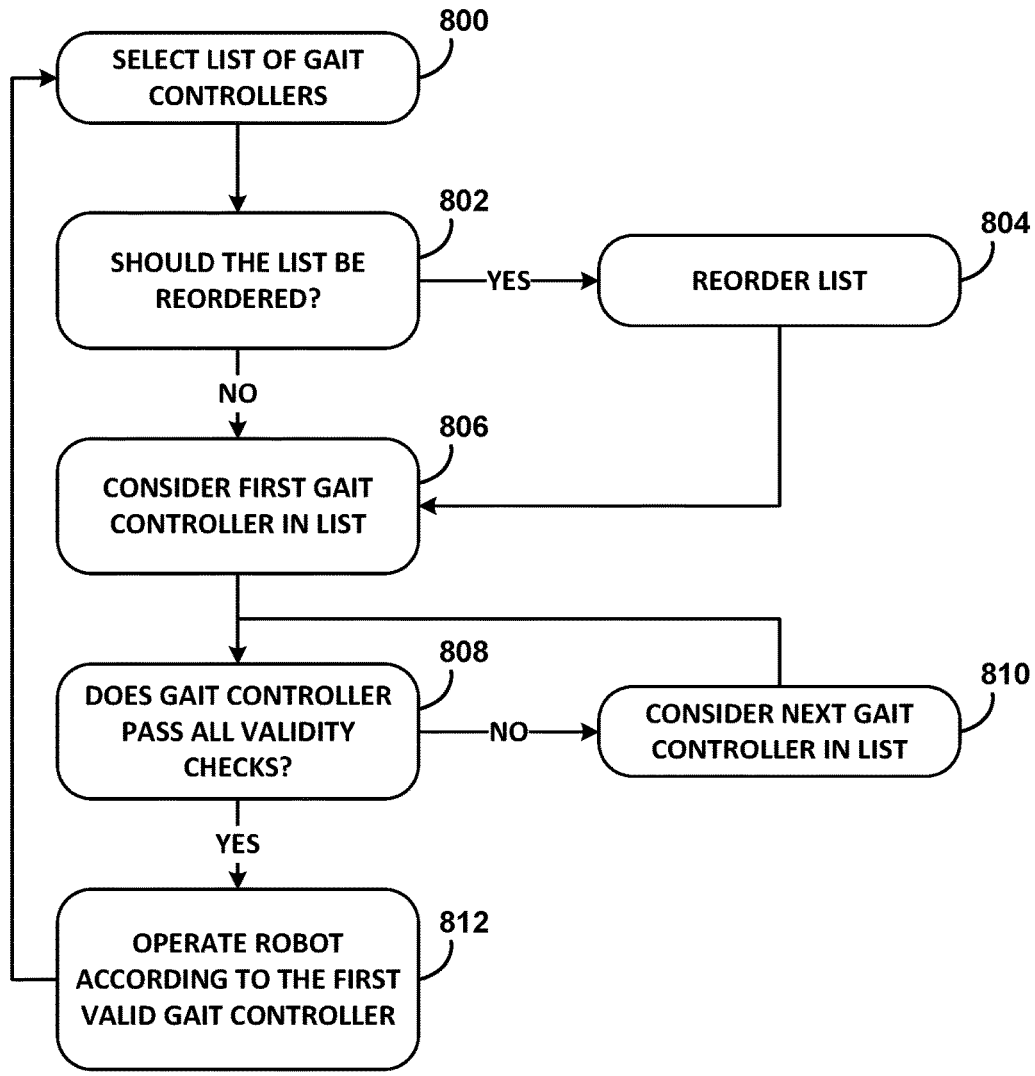
FIG. 8 is a flow chart, according to example implementations.

FIG. 8 is a flow chart depicting an algorithmic process for traversing a list of gait controllers. This process can be applied to any list of gait controllers, such as the stand list of FIG. 6A or the slow walk list of FIG. 7A.

At block 800, a list of gait controllers may be selected. The selection may be based on a particular target gait for the robot. For instance, if the robot's target gait is standing, the stand list of FIG. 6A may be selected. If the robot's target gait is slow walk, the slow walk list of FIG. 7A. Other target gaits and associated lists of gait controllers may be supported.

The target gait may, in turn, be based on one or more input commands. The robot may receive these commands from an external controller such as a joystick, or may generate the commands itself.

At block 802, a determination may be made whether to reorder the selected list. If so, at block 804 the list may be reordered. List reordering is discussed in more detail in the following section. Blocks 802 and 804 are optional, and may be omitted.

At block 806, the first gait controller in the list is considered. This is the target gait controller that would serve to operate the robot according to the target gait.

At block 808, a determination is made whether the target gait controller passes all associated validity checks. As noted earlier, the validity checks may be based on the state (e.g., the instantaneous state) of the robot, and possibly other factors as well. In particular, a validity check may consider the current gait of the robot as well as the velocity of the robot. If these factors are within the acceptable bounds of the gait controller, then the gait controller passes the validity check. If not, the gait controller fails the validity check.

Thus, if the gait controller passes the validity check, then at block 812, the robot is operated according to this gait controller. If the gait controller fails the validity check, then at block 810, the next gait controller in the list is considered. In this way, the list is traversed in order until a valid gait controller is found, and the robot is operated according to the first valid gait controller.

Since the validity checks of more than one gait controller may pass for a particular robot state and velocity, the ordering of the gait controllers in the list can have a significant impact on the robot's ultimate behavior. Therefore, the list may be ordered so that operating the robot according to gait controllers other than the target gait controller eventually (directly or indirectly) result in the robot state and velocity passing the validity check of the target gait controller. Thus, gait controllers lower in the list may be operable to change the state of the robot such that the changed state at least partially satisfies the validity check of one or more gait controllers that appear higher in the list.

The operations of FIG. 8 may be performed continuously, periodically, or from time to time. In some implementations, the operations of FIG. 8 may continuously repeat in a loop tens or hundreds of times per second. This may result in the robot switching gait controllers mid-stride one or more times. Alternatively, the robot may maintain the same gait for one or more full cycles of a gait. Other possibilities exist.

The following example illustrates the operations of FIG. 8 applied to the stand list of FIG. 6A. In this example, the robot is assumed to be a quadruped moving according to a 5.5 MPH trot. The robot may receive a command to transition to a standing position. As a result, the robot may select the stand list of FIG. 6A because the stand gait is the target gait of this list.

Starting at list position 1, the robot considers the associated gait controller. This gait controller, which is for the target stand gait, requires that all four of the robot's feet are on a surface and that the robot's velocity is less than or equal to a nominal velocity of 0.1 MPH. This non-zero nominal velocity allows the robot's COM to sway to a small extent as long as the robot maintains a four-footed contact with the surface. In any case, the validity check fails because the robot is moving with a velocity that is greater than 0.1 MPH.

The robot then considers the slow-walk-to-stand gait controller at list position 2. This gait controller requires that the robot is walking and that the robot's velocity is less than or equal to 2.5 MPH. The validity check for the slow-walk-to-stand gait controller fails because the robot's velocity is too high. This validity check may also fail because it requires that either exactly two or exactly three of the robot's feet are in contact with the surface (while some phases of the trot gait may involve exactly two feet in contact with the surface, other phases do not).

The robot then considers the slow-trot-to-stand gait controller at list position 3. This gait controller requires that the robot is trotting (e.g., with either one diagonal pair of feet on the surface while the other diagonal pair of feet are swinging, all four feet on the surface, or all four feet off of the surface) at a velocity less than or equal to 4.0 MPH. While the robot is trotting, its velocity is once again too high to pass this validity check.

The robot then considers the slow walk gait controller at list position 4, the validity check of which fails because the robot's velocity is too low, and may additionally fail because the robot is trotting. The validity check of the slow trot gait controller at list position 5 also fails because the robot's velocity is too high, as does the validity check of the medium-walk-to-slow-walk gait controller at list position 6.

However, the validity check of the medium-trot-to-slow-trot gait controller at list position 7 passes because the robot is trotting with a velocity that is greater than 4.0 MPH and less than or equal to 7.0 MPH. Therefore, the robot applies the output parameters of the medium-trot-to-slow-trot gait controller. For instance, these output parameters may define a series of leg actuation states and/or leg joint angles that transition the robot from its current trotting speed to a slow trot of 3.0 MPH.

Once the robot achieves the slow trot of 3.0 MPH, the robot traverses the list once again from the beginning. Thus, the robot considers the stand gait controller at list position 1. The validity check of this gait controller fails because the robot's velocity is too high. Next, the robot considers the slow-walk-to-stand gait controller at list position 2. The associated validity check fails for this gait controller as well, once again because the robot's velocity is too high.

The validity check of the slow-trot-to-stand gait controller passes, however, and the robot applies the associated output parameters. For instance, these output parameters may define a series of leg actuation states and/or leg joint angles that transition the robot from its current trotting speed to a standing position with zero or near-zero velocity.

After doing so, the robot continues to iterate traversals of the list, each traversal starting at the beginning of the list. As long as the robot remains standing, the validity check for the stand gait controller will pass, and the robot will remain in the standing gait (which is also the target gait). If the robot experiences a disturbance, for instance if its footing slips or it is pushed off balance, the robot may apply a different gait controller to regain its standing gait. For example, a recovery gait controller (not shown in FIG. 6A) may be used.

On the other hand, if the robot determines that it should move according to a particular gait (e.g., a walk or trot), the robot may select a different list (such as the list of FIG. 7A), and proceed according to one or more gait controllers in the selected list.

5. ADDITIONAL FEATURES

In addition to the features and operations described above, the implementations herein may include the additional features and/or operations described in this section. Nonetheless, these features are optional, and may or may not be included.

A. List Reordering

As noted in the previous section, a list of gait controllers may be reordered. For instance, a first intermediate gait controller and a second intermediate gait controller may be identified. Neither of these gait controllers are the target gait controller, but each can be used by the robot to achieve the target gait. Possibly based on an instantaneous state of the robot, the first intermediate gait controller may be selected as more favorable than the second intermediate gait controller for achieving the target gait. The list may be reordered such that the first intermediate gait controller is before the second intermediate gait controller in the list.

As an example, suppose that a standing quadruped is instructed to begin walking forward. In order to do so, the quadruped selects a foot to move first. In principle, any of the quadruped's four feet could be selected and would work equally well. Thus, the quadruped may be configured to always step first with its left front foot. However, if the robot's instantaneous stance is such that the left front foot is fully extended forward, the robot might not be able to step further forward with that foot. Therefore, in this situation, the robot should step first with one of the other three feet.

In order to facilitate making such determinations, a walk list may include four stand-to-walk controllers, each moving a different foot first. Based on its instantaneous leg actuation states and/or leg joint angles, the robot may assign a cost to each. Particularly, this cost may be higher for the fully extended left front foot than the other three feet. These four gait controllers may be sorted in increasing order of cost in the list so that a gait controller that steps first with a foot other than the front left is preferentially chosen.

Alternatively, the robot may also select a foot to step with through validity checks rather than list reordering. Particularly, the state space of the robot may be segmented such that exactly one of the four step-with-one-foot-first gait controllers is valid at a given state. Doing so limits the domain of gait controllers beyond what is required for the gait controller to be feasible. For example, consider step left and step right gait controllers, which are valid (e.g., the robot will not fall) for lateral velocity ranges of (−1,2), and (−2,1), respectively. Rather than setting validity checks that match these velocity ranges, the validity checks might be set to the lateral velocity ranges (0,2), and (−2,0) respectively. Even though the step left gait controller can operate in the range of (−1,0), this range is ruled out because operating the step right gait controller will result in smoother gait behavior.

In some embodiments, a list of gait controllers may be reordered based on the previously-running gait controller. For example, if the robot was previously running a trot gait controller and is currently operating according to the stand list, the trot-to-stand gait controller may be placed above the walk-to-stand gait controller so that the robot correctly selects the trot-to-stand gait controller even if both gait controllers are valid.

B. Further Validity Checks

In addition to validity checks involving the gait of the robot and the velocity of the robot, the pitch and/or roll of the robot may be considered as well. When performing certain tasks, such as traveling on uneven terrain, the robot's pitch and roll may deviate from zero-degree values. Such deviations may be detected by the robot's IMU, or some other sensor.

For instance, the pitch of the robot may be 10 or 20 degrees when climbing a hill, or the roll of the robot may be −10 or −20 degrees when traveling sideways on a hill. In order to maintain stability of the robot, some validity checks may include limits on the pitch and/or roll of the robot. These limits might include acceptable pitch and/or roll ranges of −10 degrees to 10 degrees, −20 degrees to 20 degrees, −40 degrees to 40 degrees, and so on. If the robot's pitch or roll falls outside of an acceptable range, a recovery gait controller may be selected that operates the robot to stabilize its pitch and/or roll.

Additional validity checks may avoid situations where the robot attempts to step out further than its foot can reach. For instance, consider the sequence of footfall patterns in FIG. 9. Pattern 900 indicates that the robot is standing, with all four feet on a surface. Possibly due to a disturbance, such as the robot being pushed to its left, the robot determines a target placement for its left front foot represented by the dotted circle. For instance, the robot may have calculated that placing its left front foot in this location would stabilize its balance. However, this location is beyond the distance that the robot can step. The validity check of any gait controller may fail if this invalid step-out is attempted.

Figure 9:
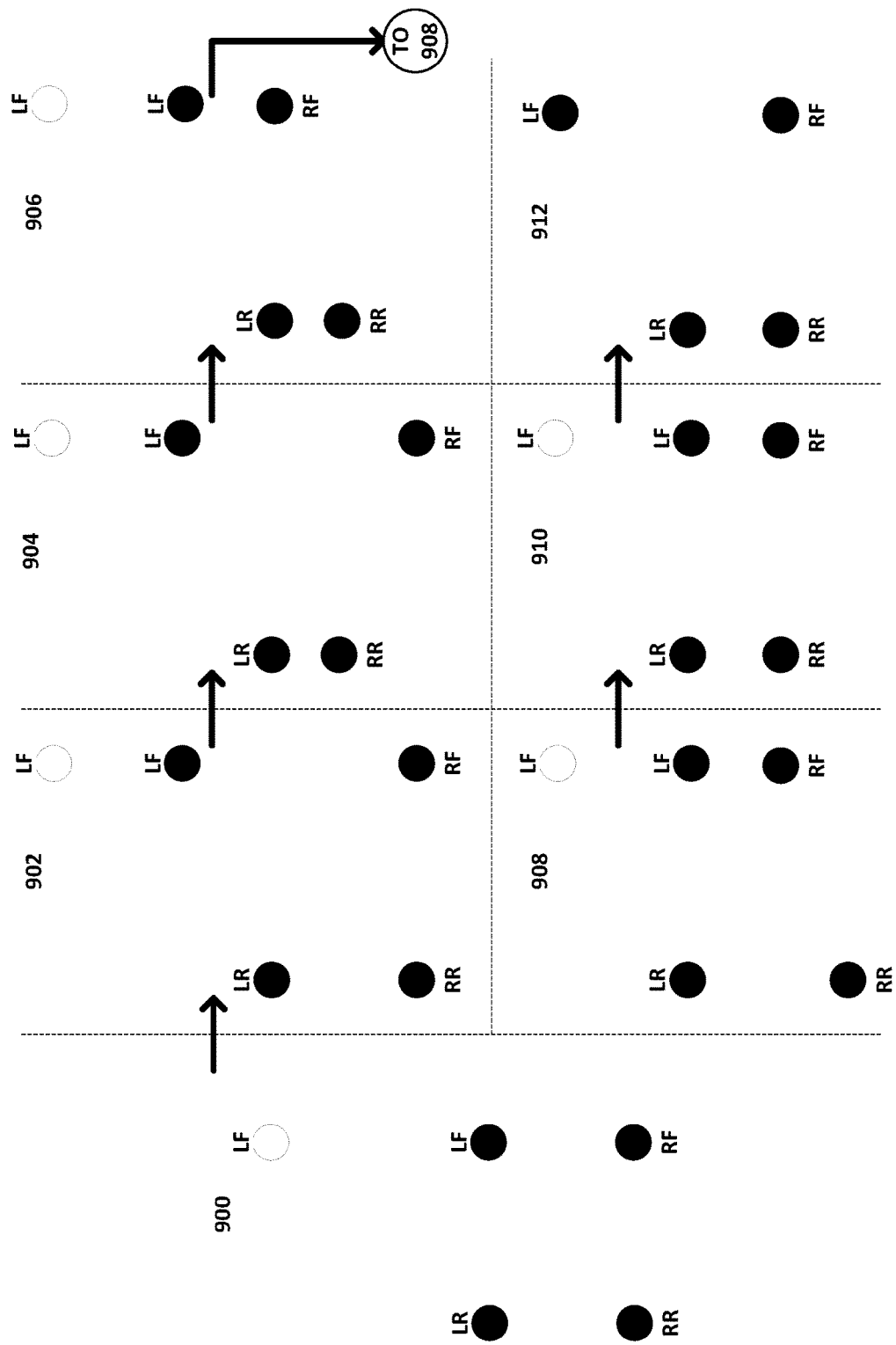
FIG. 9 depicts a sequence of footfall patterns to avoid an invalid step-out action, according to example implementations.

But, as shown in FIG. 9, the robot may instead operate according to one or more recovery gait controllers that stabilize the robot without such a step-out. Particularly, as shown in patterns 902, 904, 906, 908, 910, and 912, the recovery gait controller(s) move the robots feet laterally in smaller steps. First, the robot's left front foot moves toward the target placement, and then it is followed by the right rear foot, right front foot, left rear foot, right rear foot, and the left front foot. In pattern 912, the left front foot is at the target placement, and the robot is stabilized.

FIG. 9 is just one possible implementation of avoid an invalid step-out. Other footfall patterns may be used to accomplish this goal.

6. EXAMPLE OPERATIONS

Figure 10:
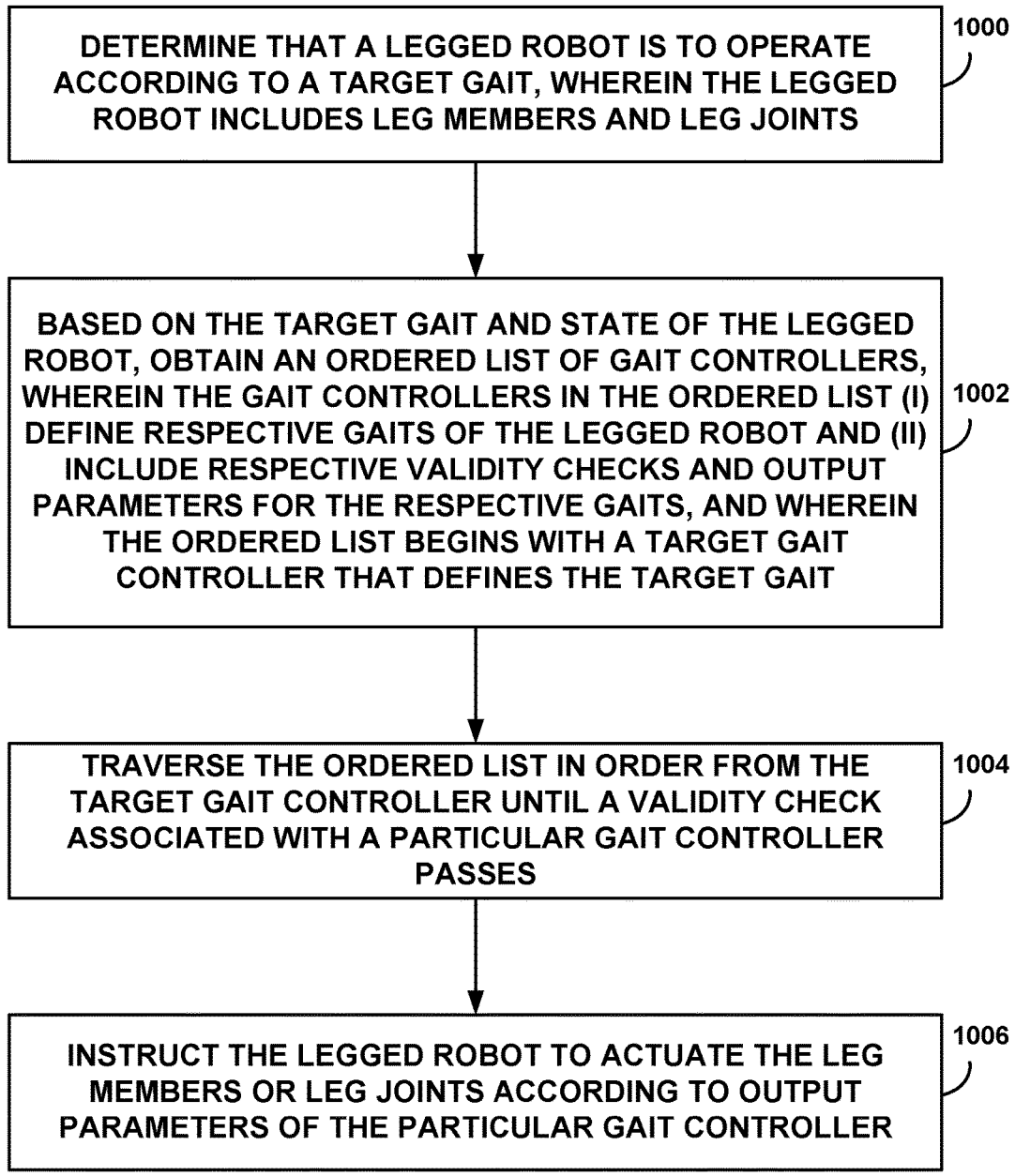
FIG. 10 is another flow chart, according to example implementations.

FIG. 10 is a flow chart illustrating an example implementation. The implementation illustrated by FIG. 10 may be carried out by a computing device, processor(s) 102 and/or controller(s) 108. However, the implementation can be carried out by other types of devices or device subsystems, including a device that is part of or not part of a legged robot being controlled. Further, the implementation may be combined with any other aspect or feature disclosed in this specification or the accompanying drawings.

Block 1000 of FIG. 10 may involve determining that a legged robot is to operate according to a target gait, wherein the legged robot includes leg members and leg joints.

Block 1002 may involve, possibly based on the target gait and state of the legged robot, obtaining an ordered list of gait controllers. The gait controllers in the ordered list may define respective gaits of the legged robot, and include respective validity checks and output parameters for the respective gaits. The ordered list may begin with a target gait controller that defines the target gait. Any given gait controller in the ordered list (that is not the target gait controller) may be operable to change the state of the legged robot such that the changed state at least partially satisfies the validity check of one or more gait controllers that appear in the ordered list before the particular gait controller.

Block 1004 may involve traversing the ordered list in order from the target gait controller until a validity check associated with a particular gait controller passes. The particular gait controller may be the target gait controller or another gait controller in the ordered list. The validity check associated with the particular gait controller may determine whether the particular gait controller is permitted to operate based on the state of the robot and/or a sensed environment of the robot, for instance.

Block 1006 may involve instructing the legged robot to actuate the leg members or leg joints according to output parameters of the particular gait controller.

In some implementations, after instructing the legged robot to actuate the leg members or leg joints according to output parameters of the particular gait controller, the ordered list may be traversed again in order from the target gait controller until a second validity check associated with a second particular gait controller passes. The legged robot may be instructed to actuate the leg members or leg joints according to output parameters of the second particular gait controller.

In some implementations, after instructing the legged robot to actuate the leg members or leg joints according to output parameters of the particular gait controller, it may be determined that the legged robot is to operate according to a second target gait. Possibly based on the second target gait and a second state of the legged robot, a second ordered list of the gait controllers may be obtained. The second ordered list may begin with a second target gait controller that defines the second target gait. The second ordered list may be traversed in order from the second target gait controller until a validity check associated with a second particular gait controller passes. The legged robot may be instructed to actuate the leg members or leg joints according to output parameters of the second particular gait controller.

At least some of the gait controllers may be either (i) cyclic gait controllers that define respective touchdown timings and positions for feet of the legged robot that cause the legged robot to operate according to the respective gaits, (ii) acyclic gait controllers that define touchdown timings and positions for the feet that cause the legged robot to transition from one gait to another, or (iii) recovery gait controllers that define touchdown timings and positions for the feet that cause the legged robot to recover from deviations from a cyclic or acyclic gait. In some implementations, the ordered list of gait controllers may include one or more of each of the cyclic gait controllers, acyclic gait controllers, and recovery gait controllers.

The legged robot may have four legs. The gait controllers may include a walk gait controller with an associated validity check that requires exactly two or exactly three legs of the legged robot to be on a surface. In some implementations, the gait controllers may include a trot gait controller with an associated validity check that requires exactly one diagonal pair of legs, all four legs, or no legs of the legged robot to be on a surface. The associated validity checks may also require that a swing foot will not land beyond a threshold distance from a COM of the robot. The gait controllers may include at least two trot gait controllers with associated validity checks that require exactly one diagonal pair of legs, all four legs, or no legs of the legged robot to be on a surface. Each of the two trot gait controllers may be associated with different trot velocities.

In some implementations, the gait controllers may include a stand gait controller with an associated validity check that requires all legs of the legged robot to be on a surface, and a velocity of the legged robot to be below a threshold value.

In some situations, possibly after block 1002 and before block 1004, a first intermediate gait controller and a second intermediate gait controller may be identified, each of which can be used for the legged robot to achieve the target gait. Possibly based on an instantaneous state of the legged robot, the first intermediate gait controller may be selected as more favorable than the second intermediate gait controller for achieving the target gait. The ordered list may be reordered such that the first intermediate gait controller is before the second intermediate gait controller in the ordered list.

7. CONCLUSION

The present disclosure is not to be limited in terms of the particular implementations described in this application, which are intended as illustrations of various aspects. Many modifications and variations can be made without departing from its scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. The example implementations described herein and in the figures are not meant to be limiting. Other implementations can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the message flow diagrams, scenarios, and flow charts in the figures and as discussed herein, each step, block, and/or communication can represent a processing of information and/or a transmission of information in accordance with example implementations. Alternative implementations are included within the scope of these example implementations. In these alternative implementations, for example, operations described as steps, blocks, transmissions, communications, requests, responses, and/or messages can be executed out of order from that shown or discussed, including substantially concurrent or in reverse order, depending on the functionality involved. Further, more or fewer blocks and/or functions can be used with any of the ladder diagrams, scenarios, and flow charts discussed herein, and these ladder diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical functions or actions in the method or technique. The program code and/or related data can be stored on any type of computer readable medium such as a storage device including a disk, hard drive, or other storage medium.

The computer readable medium can also include non-transitory computer readable media such as computer-readable media that store data for short periods of time like register memory, processor cache, and random access memory (RAM). The computer readable media can also include non-transitory computer readable media that store program code and/or data for longer periods of time. Thus, the computer readable media may include secondary or persistent long term storage, like read only memory (ROM), optical or magnetic disks, compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other implementations can include more or less of each element shown in a given figure. Further, some of the illustrated elements can be combined or omitted. Yet further, an example implementation can include elements that are not illustrated in the figures.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims.

What is claimed is:

1. A legged robot comprising:
   legs, each leg having a respective leg joint;
   one or more sensors;
   a data processor in communication with the one or more sensors; and
   a non-transitory computer-readable medium in communication with the data processor and storing instructions, that when executed by the data processor, cause the data processor to perform operations comprising:
      receiving sensor information from the one or more sensors;
      determining an instantaneous state of the legged robot based on the sensor information, the instantaneous state comprising at least one of a position of the legged robot, a velocity of the legged robot, an angle associated with each leg joint, or a torque associated with each leg joint;
      receiving an input command from an external controller in communication with the data processor, the input command comprising an instruction for the legged robot to perform a target gait for operating the legged robot on a ground surface;
      obtaining an ordered list of gait controllers based on the target gait for operating the legged robot, each gait controller associated with a respective gait for operating the legged robot and comprising:
         a validity check associated with the respective gait; and
         one or more output parameters associated with the respective gait;
      determining whether the instantaneous state of the legged robot satisfies the validity check associated with the respective gait for a first gait controller of the ordered list of gait controllers, the respective gait for the first gait controller comprising the target gait; and
      when the instantaneous state of the legged robot satisfies the validity check associated with the target gait for the first gait controller, instructing the legs and/or the respective leg joints to actuate based on the one or more output parameters associated with the target gait, the actuation of the legs and/or the leg joints causing the legged robot to achieve the target gait,
      wherein the one or more output parameters associated with the respective gait for each gait controller comprise:
         target footstep locations to achieve the respective gait; and
         at least one of target joint torques or target joint angles for the leg joints to achieve the target footstep locations.

2. The legged robot of claim 1, wherein the operations further comprise, when the instantaneous state of the legged robot does not satisfy the validity check associated with the target gait:
   determining whether the instantaneous state of the legged robot satisfies the validity check associated with the respective gait for a second gait controller of the ordered list of gait controllers, the respective gait for the second gait controller comprising a first intermediary gait for operating the legged robot to achieve the target gait; and
   when the instantaneous state of the legged robot satisfies the validity check associated with the first intermediary gait for the second gait controller, instructing the legs and/or the leg joints to actuate based on the one or more output parameters associated with the first intermediary gait for the second gait controller, the actuation of the legs and/or the leg joints causing the legged robot to achieve the first intermediary gait.

3. The legged robot of claim 2, wherein the operations further comprise, after instructing the legs and/or the leg joints to actuate based on the one or more output parameters associated with the first intermediary gait:
   determining whether the instantaneous state of the legged robot satisfies the validity check associated with the respective gait for the first gait controller of the ordered list of gait controllers; and
   when the instantaneous state of the legged robot satisfies the validity check associated with the target gait for the first gait controller, instructing the legs and/or the leg joints to actuate based on the one or more output parameters associated with the respective gait, the actuation of the legs and/or the leg joints causing the legged robot to achieve the target gait.

4. The legged robot of claim 2, wherein the operations further comprise, when the instantaneous state of the legged robot does not satisfy the validity check associated with the first intermediary gait:
   identifying a next gait controller in the ordered list of gait controller having an associated validity check satisfied by the instantaneous state of the legged robot; and
   instructing the legs and/or the leg joints to actuate based on the one or more output parameters associated with the respective gait for the identified next gait controller, the actuation of the legs and/or the leg joints causing the legged robot to achieve the respective gait.

5. The legged robot of claim 1, wherein at least one of the gait controllers of the ordered list of gait controllers comprises:
   a cyclic gait controller defining respective touchdown timings and positions for feet of the legged robot that cause the legged robot to operate according to the respective gait;
   an acyclic gait controller defining touchdown timings and positions for the feet that cause the legged robot to transition from one gait to another gait; or a recovery gait controller defining touchdown timings and positions for the feet that cause the legged robot to recover from deviations from a cyclic gait or an acyclic gait.

6. The legged robot of claim 1, wherein the respective gaits for the gait controllers comprise one of a standing gait, a slow-walk-to-stand gait, a slow walk gait, a medium-walk-to-slow-walk gait, or a medium walk gait.

7. The legged robot of claim 1, further comprising a foot or a wheel coupled to each leg.

8. A legged robot comprising:
legs, each leg having a respective leg joint;
one or more sensors;
a data processor in communication with the one or more sensors; and
a non-transitory computer-readable medium in communication with the data processor and storing instructions, that when executed by the data processor, cause the data processor to perform operations comprising:
receiving sensor information from the one or more sensors;
determining an instantaneous state of the legged robot based on the sensor information, the instantaneous state comprising at least one of a position of the legged robot, a velocity of the legged robot, an angle associated with each leg joint, or a torque associated with each leg joint;
receiving an input command from an external controller in communication with the data processor, the input command comprising an instruction to move the legged robot to a target geographical location;
determining a target gait for operating the legged robot on a ground surface based on the target geographical location;
obtaining an ordered list of gait controllers based on the target gait for operating the legged robot, each gait controller associated with a respective gait for operating the legged robot and comprising:
a validity check associated with the respective gait; and
one or more output parameters associated with the respective gait;
determining whether the instantaneous state of the legged robot satisfies the validity check associated with the respective gait for a first gait controller of the ordered list of gait controllers, the respective gait for the first gait controller comprising the target gait; and
when the instantaneous state of the legged robot satisfies the validity check associated with the target gait for the first gait controller, instructing the legs and/or the respective leg joints to actuate based on the one or more output parameters associated with the target gait, the actuation of the legs and/or the leg joints causing the legged robot to achieve the target gait,
wherein the one or more output parameters associated with the respective gait for each gait controller comprise:
target footstep locations to achieve the respective gait; and
at least one of target joint torques or target joint angles for the leg joints to achieve the target footstep locations.

9. The legged robot of claim 8, wherein the operations further comprise, when the instantaneous state of the legged robot does not satisfy the validity check associated with the target gait:

determining whether the instantaneous state of the legged robot satisfies the validity check associated with the respective gait for a second gait controller of the ordered list of gait controllers, the respective gait for the second gait controller comprising a first intermediary gait for operating the legged robot to achieve the target gait; and
when the instantaneous state of the legged robot satisfies the validity check associated with the first intermediary gait for the second gait controller, instructing the legs and/or the leg joints to actuate based on the one or more output parameters associated with the first intermediary gait for the second gait controller, the actuation of the legs and/or the leg joints causing the legged robot to achieve the first intermediary gait.

10. The legged robot of claim 9, wherein the operations further comprise, after instructing the legs and/or the leg joints to actuate based on the one or more output parameters associated with the first intermediary gait:
determining whether the instantaneous state of the legged robot satisfies the validity check associated with the respective gait for the first gait controller of the ordered list of gait controllers; and
when the instantaneous state of the legged robot satisfies the validity check associated with the target gait for the first gait controller, instructing the legs and/or the leg joints to actuate based on the one or more output parameters associated with the respective gait, the actuation of the legs and/or the leg joints causing the legged robot to achieve the target gait.

11. The legged robot of claim 9, wherein the operations further comprise, when the instantaneous state of the legged robot does not satisfy the validity check associated with the first intermediary gait:
identifying a next gait controller in the ordered list of gait controller having an associated validity check satisfied by the instantaneous state of the legged robot; and
instructing the legs and/or the leg joints to actuate based on the one or more output parameters associated with the respective gait for the identified next gait controller, the actuation of the legs and/or the leg joints causing the legged robot to achieve the respective gait.

12. The legged robot of claim 8, wherein at least one of the gait controllers of the ordered list of gait controllers comprises:
a cyclic gait controller defining respective touchdown timings and positions for feet of the legged robot that cause the legged robot to operate according to the respective gait;
an acyclic gait controller defining touchdown timings and positions for the feet that cause the legged robot to transition from one gait to another gait; or
a recovery gait controller defining touchdown timings and positions for the feet that cause the legged robot to recover from deviations from a cyclic gait or an acyclic gait.

13. The legged robot of claim 8, wherein the respective gaits for the gait controllers comprise one of a standing gait, a slow-walk-to-stand gait, a slow walk gait, a medium-walk-to-slow-walk gait, or a medium walk gait.

14. The legged robot of claim 8, further comprising a foot or a wheel coupled to each leg.

* * * * *